US008462372B2

(12) United States Patent
Shimmoto

(10) Patent No.: US 8,462,372 B2
(45) Date of Patent: Jun. 11, 2013

(54) IMAGE PROCESSING APPARATUS AND IMAGE PROCESSING METHOD FOR STORING OUTPUT PATTERN DATA ACCORDING TO A KIND OF DOCUMENT

(75) Inventor: Takafumi Shimmoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 717 days.

(21) Appl. No.: 12/397,674

(22) Filed: Mar. 4, 2009

(65) Prior Publication Data
US 2009/0225345 A1 Sep. 10, 2009

(30) Foreign Application Priority Data
Mar. 5, 2008 (JP) ................................ 2008-054819

(51) Int. Cl.
G06F 3/12 (2006.01)
(52) U.S. Cl.
USPC ......... 358/1.15; 358/1.1; 358/1.16; 358/1.18; 399/81; 715/811
(58) Field of Classification Search
None
See application file for complete search history.

(56) References Cited

U.S. PATENT DOCUMENTS

| 7,249,319 | B1* | 7/2007 | Payne et al. | 715/209 |
| 2002/0059278 | A1* | 5/2002 | Bailey et al. | 707/100 |
| 2002/0138519 | A1* | 9/2002 | Miller | 707/517 |
| 2006/0029293 | A1* | 2/2006 | Matsuzaki | 382/298 |
| 2007/0211080 | A1* | 9/2007 | Adams et al. | 345/619 |
| 2008/0199199 | A1* | 8/2008 | Kato et al. | 399/81 |
| 2008/0270516 | A1* | 10/2008 | Ragnet et al. | 709/202 |
| 2009/0083614 | A1* | 3/2009 | Wedekind | 715/217 |

FOREIGN PATENT DOCUMENTS

| JP | 2006-186918 | 7/2006 |
| JP | 2008-141506 | 6/2008 |

* cited by examiner

Primary Examiner — Benjamin O Dulaney
(74) Attorney, Agent, or Firm — Oblon, Spivak, McClelland, Maier & Neustadt, L.L.P.

(57) ABSTRACT

An image processing apparatus for outputting a document including a data group containing plural data items is disclosed that includes a storing part configured to store document definition data in which a document kind information is defined in correspondence with an output pattern information, the output pattern information including an output method data and an output condition data, a structured data fabricating part configured to fabricate structured data including the group of data according to the document kind information, an image data fabricating part configured to fabricate image data of the document according to the structured data, an identifying part configured to identify target document definition data among the document definition data that correspond to designated document kind information, and an outputting part configured to output the image data according to the output pattern information corresponding to the document kind information defined in the target document definition data.

20 Claims, 24 Drawing Sheets

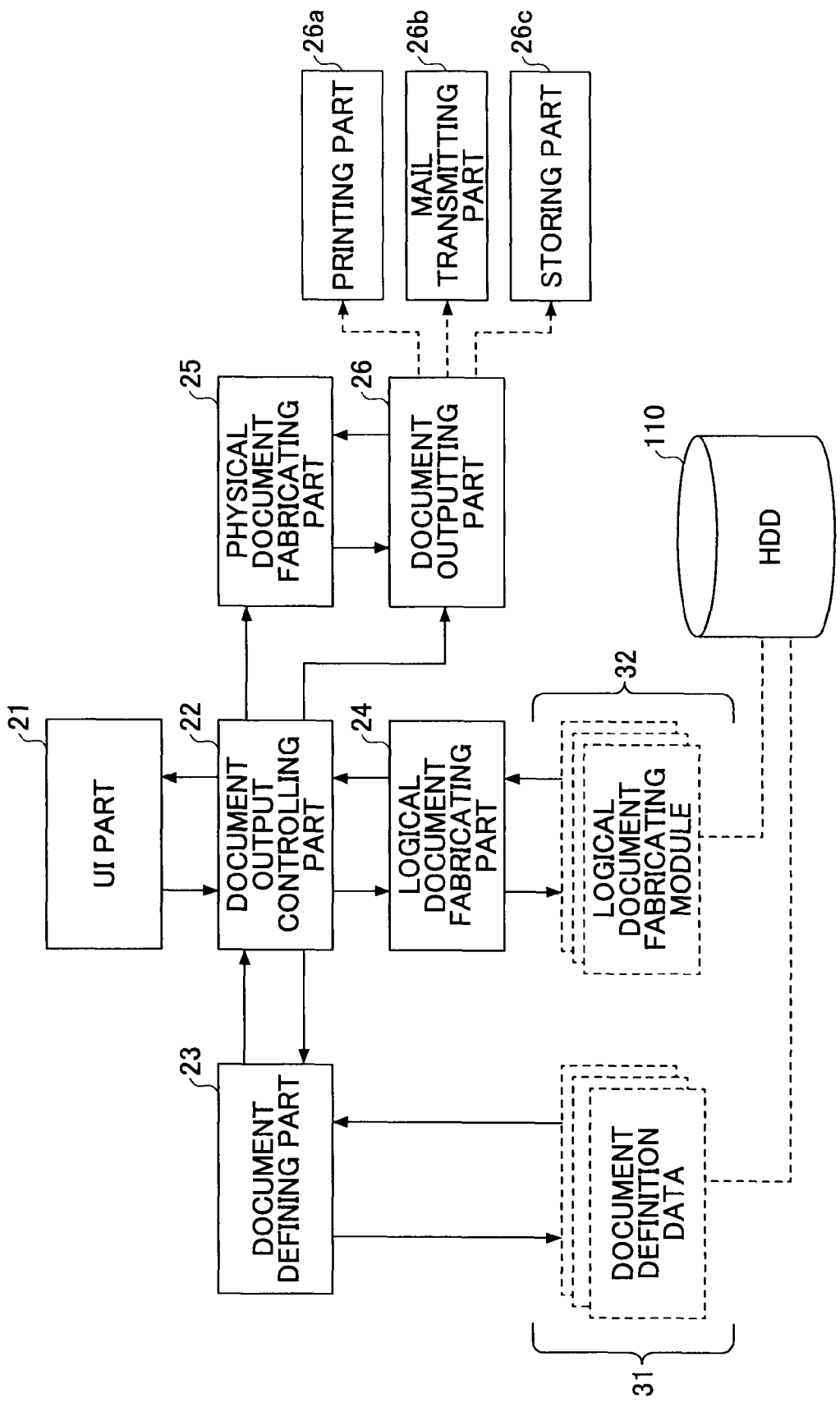

FIG.3B

DOCUMENT LIST P

| DOCUMENT NAME | USER NAME | APPLICATION |
|---|---|---|
| REPORT | User001 | COPY |
| PROPOSAL | User001 | STORE |
| MINUTE A | User002 | TRANSMIT |
| MINUTE B | User002 | TRANSMIT |
| FUNCTION SPECIFICATIONS | User003 | COPY |
| DETAIL DESIGN SPECIFICATIONS | User003 | COPY |

```
<?xml version = "1.0" encoding = "Shift-JIS"?>
<?xml stylesheet type = "text/xsl" href = "rep.xsl"?>

<header>
DOCUMENT LIST
</header>
<body>
<tag>DOCUMENT NAME</tag> ...
<doc_name>REPORT</doc_name> ...
  :    :    :
  :    :    :
</body>
```

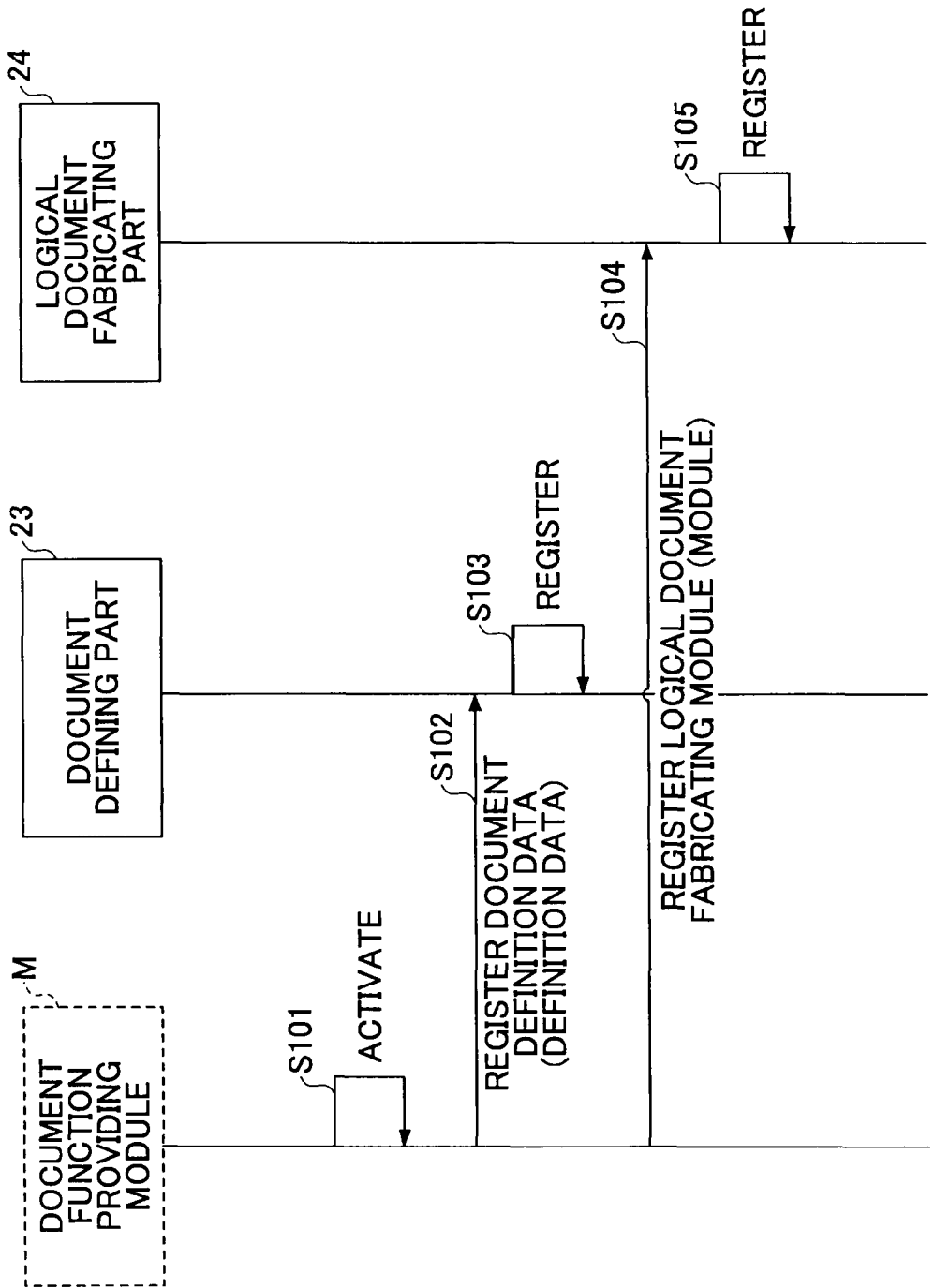

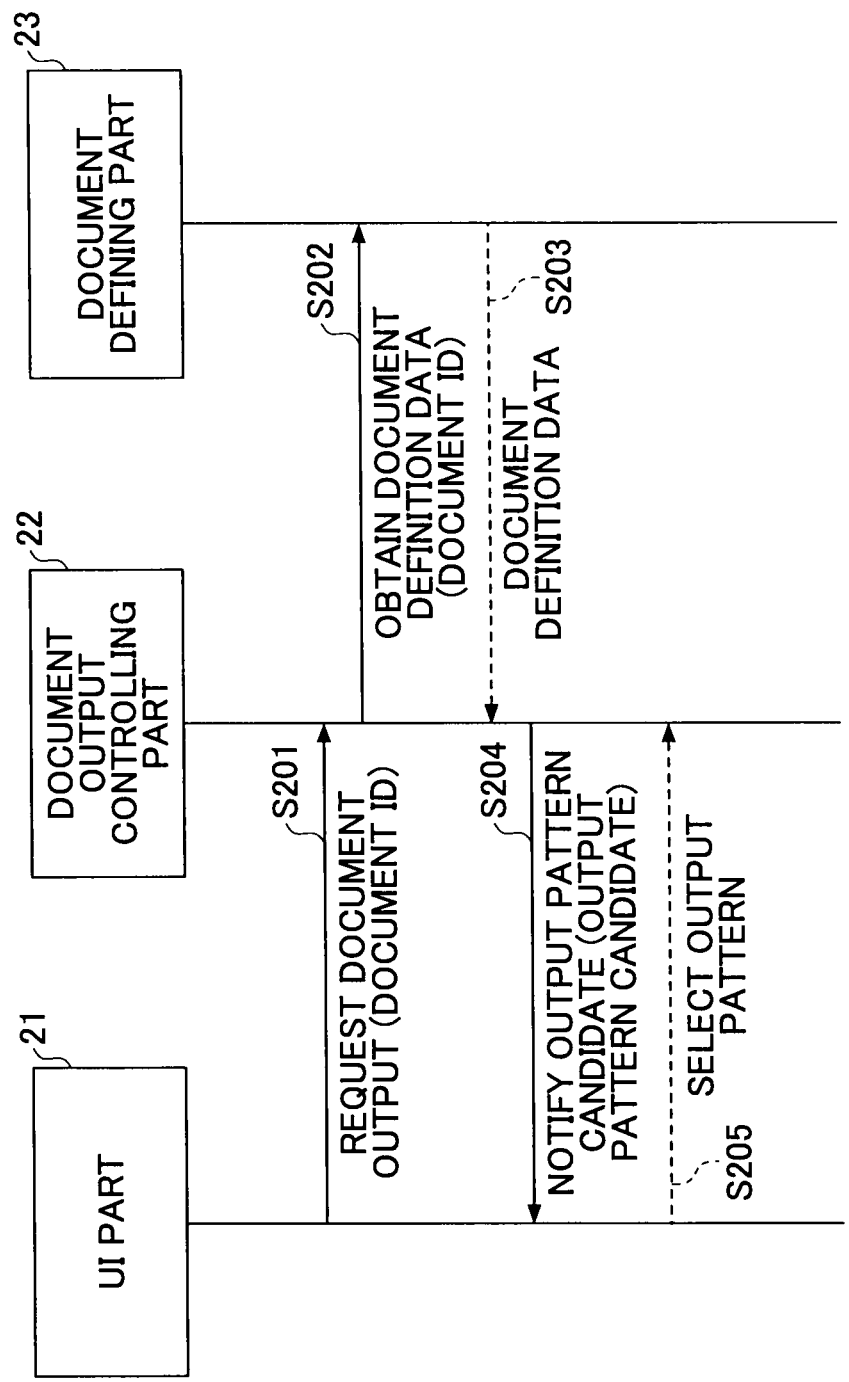

FIG.8A

DOCUMENT LIST

| DOCUMENT NAME | USER NAME | APPLICATION | FABRICATION DATE/TIME | PASSWORD | NUMBER OF PAGES |
|---|---|---|---|---|---|
| REPORT | User001 | COPY | 12/1 17:00 | NO | 3 |
| PROPOSAL | User001 | STORE | 12/1 11:30 | YES | 16 |
| MINUTE A | User002 | TRANSMIT | 12/3 11:32 | NO | 4 |
| MINUTE B | User002 | TRANSMIT | 1/7 15:01 | YES | 3 |
| FUNCTION SPECIFICATIONS | User003 | COPY | 1/7 15:25 | YES | 4 |
| DETAIL DESIGN SPECIFICATIONS | User003 | COPY | 1/8 16:42 | YES | 25 |
| FUNCTION TEST SPECIFICATIONS | User003 | COPY | 1/11 10:30 | YES | 19 |
|  |  |  |  |  |  |
|  |  |  |  |  |  |

FIG.8B

DOCUMENT LIST

| DOCUMENT NAME | USER NAME | APPLICATION |
|---|---|---|
| REPORT | User001 | COPY |
| PROPOSAL | User001 | STORE |
| MINUTE A | User002 | TRANSMIT |

FIG.9A

DOCUMENT LIST

| DOCUMENT NAME | USER NAME | APPLICATION | FABRICATION DATE/TIME | PASSWORD | NUMBER OF PAGES |
|---|---|---|---|---|---|
| REPORT | User001 | COPY | 12/1 17:00 | NO | 3 |
| PROPOSAL | User001 | STORE | 12/1 11:30 | YES | 16 |
| MINUTE A | User002 | TRANSMIT | 12/3 11:32 | NO | 4 |
| MINUTE B | User002 | TRANSMIT | 1/7 15:01 | YES | 3 |
| FUNCTION SPECIFICATIONS | User003 | COPY | 1/7 15:25 | YES | 4 |
| DETAIL DESIGN SPECIFICATIONS | User003 | COPY | 1/8 16:42 | YES | 25 |
| FUNCTION TEST SPECIFICATIONS | User003 | COPY | 1/11 10:30 | YES | 19 |
| | | | | | |
| | | | | | |

FIG.9B

DOCUMENT LIST

| DOCUMENT NAME | USER NAME | APPLICATION | FABRICATION DATE/TIME | PASSWORD | NUMBER OF PAGES |
|---|---|---|---|---|---|
| REPORT | User001 | COPY | 12/1 17:00 | NO | 3 |
| PROPOSAL | User001 | STORE | 12/1 11:30 | YES | 16 |
| MINUTE A | User002 | TRANSMIT | 12/3 11:32 | NO | 4 |
| MINUTE B | User002 | TRANSMIT | 1/7 15:01 | YES | 3 |
| FUNCTION SPECIFICATIONS | User003 | COPY | 1/7 15:25 | YES | 4 |
| DETAIL DESIGN SPECIFICATIONS | User003 | COPY | 1/8 16:42 | YES | 25 |
| FUNCTION TEST SPECIFICATIONS | User003 | COPY | 1/11 10:30 | YES | 19 |
| | | | | | |
| | | | | | |

FIG.10A

DOCUMENT LIST

| DOCUMENT NAME | USER NAME | APPLICATION | FABRICATION DATE/TIME | PASSWORD | NUMBER OF PAGES |
|---|---|---|---|---|---|
| REPORT | User001 | COPY | 12/1 17:00 | NO | 3 |
| PROPOSAL | User001 | STORE | 12/1 11:30 | YES | 16 |
| MINUTE A | User002 | TRANSMIT | 12/3 11:32 | NO | 4 |
| MINUTE B | User002 | TRANSMIT | 1/7 15:01 | YES | 3 |
| FUNCTION SPECIFICATIONS | User003 | COPY | 1/7 15:25 | YES | 4 |
| DETAIL DESIGN SPECIFICATIONS | User003 | COPY | 1/8 16:42 | YES | 25 |
| FUNCTION TEST SPECIFICATIONS | User003 | COPY | 1/11 10:30 | YES | 19 |
|  |  |  |  |  |  |
|  |  |  |  |  |  |

FIG.10B

DOCUMENT LIST

| DOCUMENT NAME | USER NAME | APPLICATION |
|---|---|---|
| FABRICATION DATE/TIME | PASSWORD | NUMBER OF PAGES |
| REPORT | User001 | COPY |
| 12/1 17:00 | NO | 3 |
| PROPOSAL | User001 | STORE |
| 12/1 11:30 | YES | 16 |

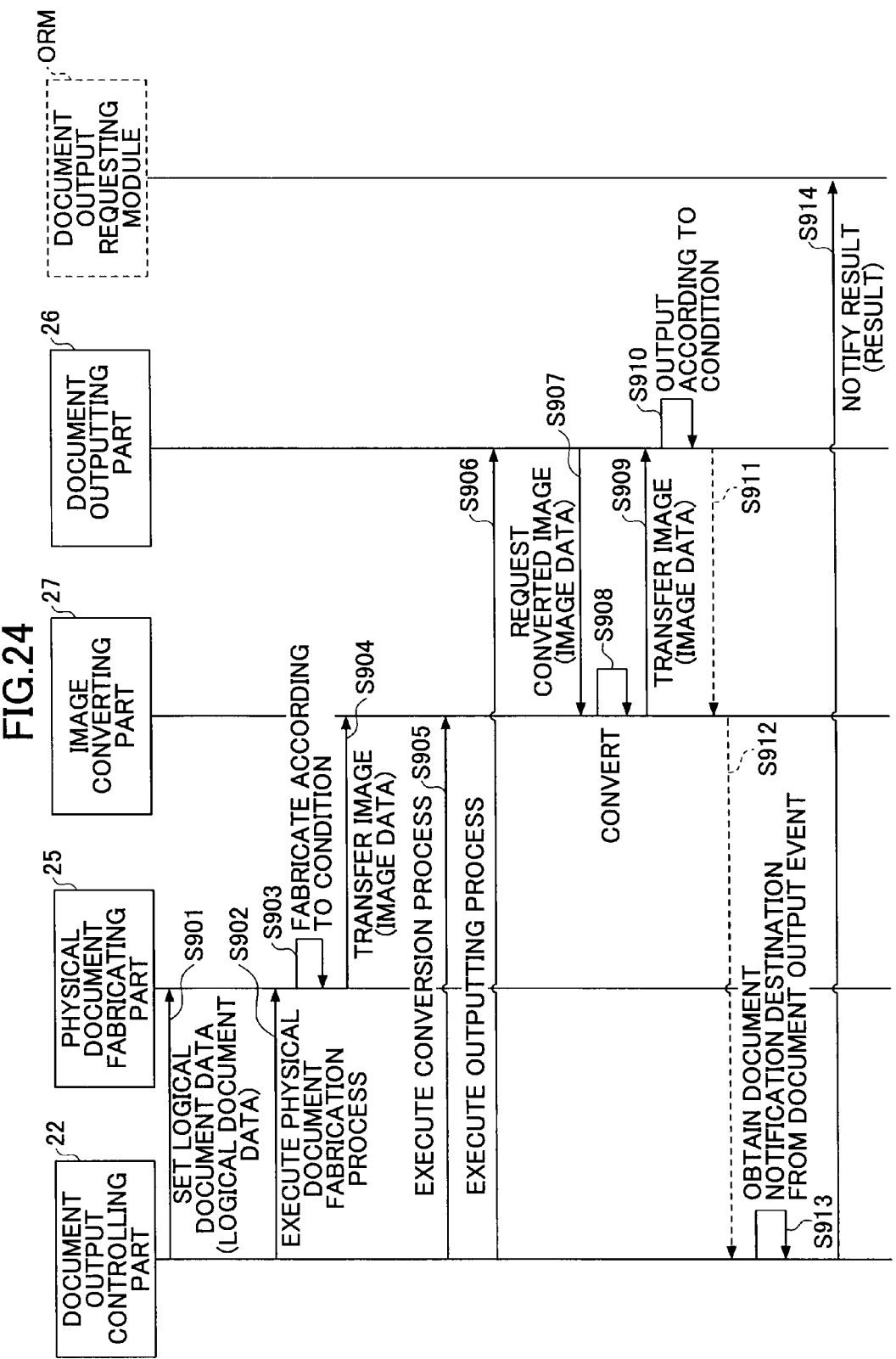

IMAGE PROCESSING APPARATUS AND IMAGE PROCESSING METHOD FOR STORING OUTPUT PATTERN DATA ACCORDING TO A KIND OF DOCUMENT

BACKGROUND OF THE INVENTION

1. Field of the Invention

The present invention relates to an apparatus and a method for storing various types of data into a storage device and managing the data. For example, the present invention relates to outputting the various types of data as a document.

2. Description of the Related Art

A digital multifunction machine (MFP: Multifunction Peripheral), which is a representative example of today's image processing apparatus, includes various application functions (e.g., a copier function, a facsimile function, a scanner function, a printer function) and a communications function. Instead of being connected to a user on a one-to-one basis, the image processing apparatus is often connected to plural PCs (personal computers, also referred to as "user terminals") and other image processing apparatuses having a communications function (e.g., management server) via a network based on a one to n relationship and serves as one of the elements in a system. Therefore, besides managing and operating on information unique to the image processing apparatus or other apparatuses connected to the image processing apparatus, the image processing apparatus may manage and operate on information regarding the user(s) connected to the image processing apparatus.

For example, Japanese Laid-Open Patent Publication No. 2006-186918 discloses an image processing apparatus managing various types of information in which the various types of information can be output as a document (document output function) for enabling the user to easily confirm the information. The image processing apparatus proposed in Japanese Laid-Open Patent Publication No. 2006-186918 utilizes its printer function for fabricating document data by using a suitable font and printing (outputting) the fabricated document data.

However, in outputting the document data, the method for outputting the document data is uniquely defined in correspondence with each type of data (information). In other words, document data cannot be arbitrarily output by a method desired by the user (e.g., output by electronic mail).

Further, since the method for outputting the document data is uniquely defined in correspondence with each type of data, the document data may not be output in a format (e.g., PDF (Portable Document Format)) or a printing condition (e.g., double-side printing, N-up printing) desired by the user.

SUMMARY OF THE INVENTION

The present invention may provide an image processing apparatus and an image processing method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image processing apparatus and an image processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image processing apparatus for outputting a document including a data group containing a plurality of data items, including: a storing part configured to store document definition data in which document kind data are defined in correspondence with output pattern data, the output pattern data including output method data and output condition data; a structured data fabricating part configured to fabricate structured data including the data group according to the document kind data; an image data fabricating part configured to fabricate image data of the document according to the structured data; an identifying part configured to identify target document definition data among the document definition data that correspond to designated document kind data; and an outputting part configured to output the image data according to the output pattern data corresponding to the document kind data defined in the target document definition data.

Furthermore, another embodiment of the present invention provides an image processing method for outputting a document including a data group containing a plurality of data items, including the steps of: storing document definition data in which document kind data are defined in correspondence with output pattern data, the output pattern data including output method data and output condition data; fabricating structured data including the data group according to the document kind data; fabricating image data of the document according to the structured data; identifying target document definition data among the document definition data that correspond to designated document kind data; and outputting the image data according to the output pattern data corresponding to the document kind data defined in the target document definition data.

Other objects, features and advantages of the present invention will become more apparent from the following detailed description when read in conjunction with the accompanying drawings.

BRIEF DESCRIPTION OF THE DRAWINGS

FIG. 2 is a schematic diagram illustrating an image processing function according to an embodiment of the present invention;

FIG. 3A illustrates an example of logical document data according to an embodiment of the present invention;

FIG. 3B illustrates an example of physical document data P according to an embodiment of the present invention;

FIG. 4 is a schematic diagram illustrating processes (steps) for registering document definition data and logical document fabricating modules according to an embodiment of the present invention;

FIG. 7 is a schematic diagram illustrating processes for notifying (reporting) output pattern candidates according to an embodiment of the present invention;

FIG. 8A illustrates an example of the physical document data of a "document list" fabricated by a physical document fabricating part according to an embodiment of the present invention;

FIG. 8B illustrates an example of another physical document data fabricated in a manner having its data items reduced by a physical document fabricating part according to an embodiment of the present invention;

FIG. 9A illustrates an example of the physical document data of a "document list" fabricated by a physical document fabricating part according to an embodiment of the present invention;

FIG. 9B illustrates an example of another physical document data set fabricated in a manner having its size reduced by the physical document fabricating part according to an embodiment of the present invention;

FIG. 10A illustrates an example of another physical document data of a "document list" fabricated by a physical document fabricating part according to an embodiment of the present invention;

FIG. 10B illustrates an example of another physical document data set fabricated in a manner having parts of the document data indented by a physical document fabricating part according to an embodiment of the present invention;

FIG. 24 is a schematic diagram for describing the processes for notifying an output result after a document output process according to an embodiment of the present invention.

DETAILED DESCRIPTION OF THE PREFERRED EMBODIMENTS

[First Embodiment]
<Hardware Configuration>

Figure 1:
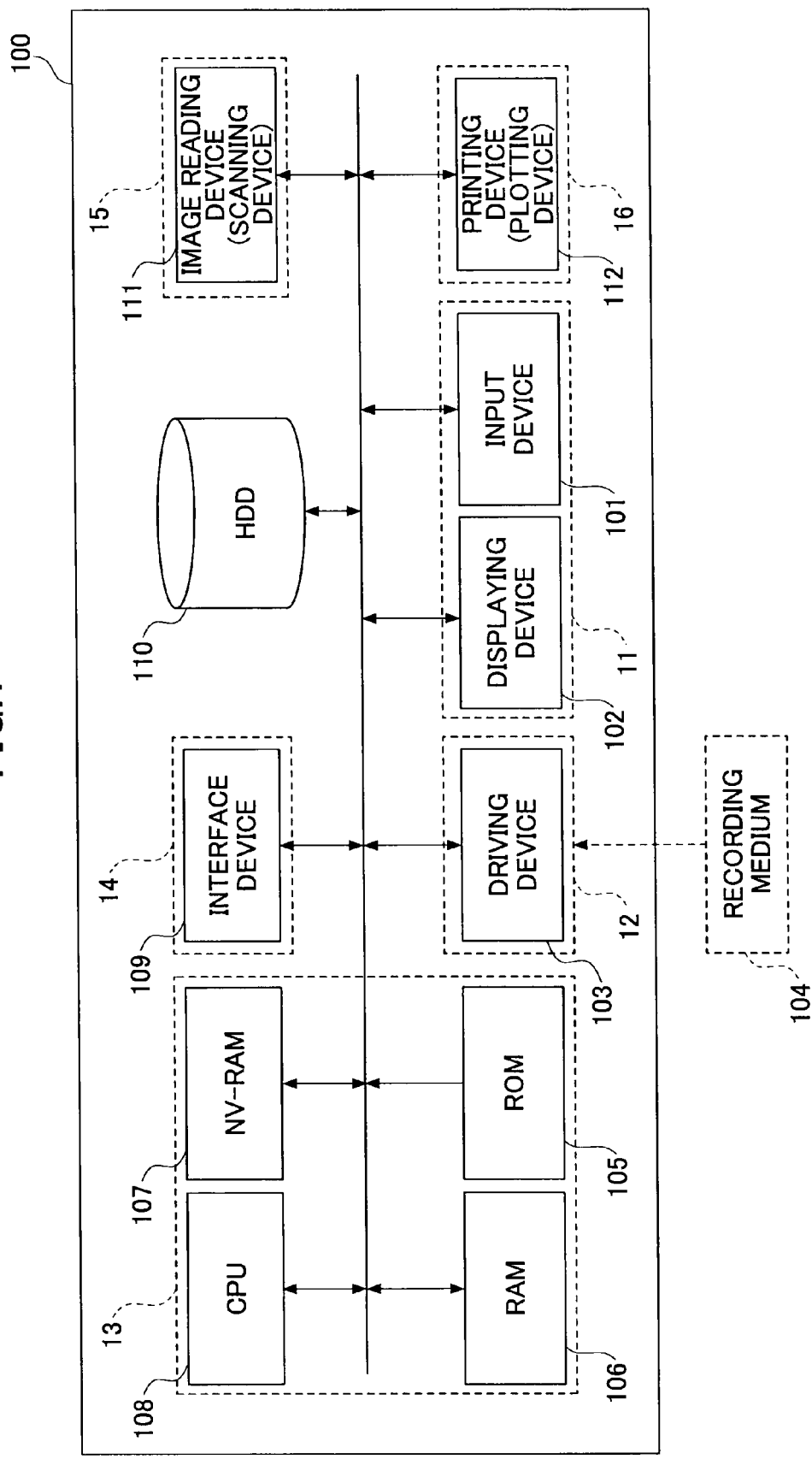
FIG. 1 is a schematic diagram illustrating a hardware configuration of an image processing apparatus according to an embodiment of the present invention.

A hardware configuration of an image processing apparatus 100 according to a first embodiment of the present invention is described with reference to FIG. 1. FIG. 1 is a schematic diagram illustrating the hardware configuration of the image processing apparatus 100 according to the first embodiment.

The image processing apparatus 100 includes a control panel 11, an external storage device I/F 12, a controller 13, a data communications I/F 14, a Hard Disk Drive (HDD) 110, a scanner 15, and a plotter 16 that are connected to a bus.

The control panel 11 includes an input device 101 and a display device 102. The input device 101 includes, for example, hardware keys (keyboard) for inputting control signal into the image processing apparatus 100. The display device 102 includes, for example, a display for displaying information such as conditions for performing an image processing operation.

The data communications interface (I/F) 14 includes a host interface device 109 for connecting the image processing apparatus 100 to, for example, telecommunication lines of a data communications network such as a wired and/or wireless structure LAN (Local Area Network) or a WAN (Wide Area Network).

The HDD 110 is for storing various data processed by the image processing apparatus 100 such as received document data or read out image data. The HDD 110 is also for managing the various data by using a predetermined file system and databases (DB).

The recording medium I/F 12 includes a drive apparatus 103 for connecting the image processing apparatus 100 to the recording medium 104 (e.g., flash memory). With the recording medium I/F 12, data can be exchanged between the image processing apparatus 100 and the recording medium 104. For example, the recording medium 104 is used when installing an image processing program into the image processing apparatus 100 for realizing an image processing function.

The controller 13 includes, for example, a ROM (Read Only Memory) 105, a RAM (Random Access Memory) 106, an NV-RAM (Non-volatile RAM) 107, and a CPU (Central Processing Unit) 108. The ROM 105 is for storing, for example, various data and programs (e.g., program serving as an Operating System (OS), programs (applications) for realizing functions of the image processing apparatus 100) used by the image processing apparatus 100. The RAM 106 is for temporarily storing, for example, various data and programs read out from the ROM 105 or the HDD 110. The NV-RAM 107 is for storing, for example, initial values used for controlling the image processing process performed by the image processing apparatus 100. The CPU 108 is for executing, for example, programs temporarily stored by the RAM 106. With the controller 13 in a case of receiving print data via the data communications I/F 14, the RAM 106 temporarily stores a PDL (Page Description Language) file of the print data read out from the ROM 105 and the CPU interprets and executes a program (PDL parser) of the PDL file, to thereby generate a bitmap image of the print data.

The scanner 15 includes an image reading device 111 for optically reading image data from a document placed on a reading plane and generating the read out image data. The plotter 16 includes a printing device 112. For example, the plotter 16 prints bitmap image data transferred from the controller 13 onto a recording medium (printing paper) by using an electrophotographic method. Alternatively, the image data may be printed by using another method such as an inkjet method.

With the above-described image processing apparatus 100, a desired image process can be performed on data input from the various interfaces of the image processing apparatus by enabling the CPU 108 to execute a program(s) read out by the RAM 106 of the controller 13.

<Image Processing Function>

In order to provide various services for the user, the image processing apparatus 100 manages and operates on various kinds of data. These various kinds of data can be output as a document in correspondence with methods and conditions for outputting the data. Next, an image processing function for outputting (document outputting) the various kinds of data is described.

<<Configuration of Each Function Part for Achieving Image Processing Function>>

FIG. 2 is a schematic diagram illustrating an image processing function according to a first embodiment of the present invention. The image processing apparatus 100 according to an embodiment of the present invention includes function parts such as a UI (User Interface) part 21, a document output controlling part 22, a document defining part 23, a logical document fabricating part 24, a physical document fabricating part 25, and a document outputting part 26. By utilizing these function parts 21-26, documents can be output in various patterns (i.e. below-described output patterns) for the user handling various types of information (data).

The UI part 21 is for accepting (receiving), for example, requests (instructions) to perform various operations/processes and conditions for performing the operations/processes.

The document output controlling part 22 is for controlling overall document outputting operations according to the image processing function. For example, the document output controlling part 22 controls a document output operation of the image processing apparatus 100 by transmitting commands and input data to the function parts of the image processing apparatus 100 and receiving outputs from the function parts of the image processing apparatus 100.

The document defining part 23 is for managing document definition data 31 indicating definitions of data used in outputting documents. The document defining part 23 manages the document definition data 31, for example, by adding/deleting data to/from the document definition data 31.

For example, the document definition data 31 include data regarding the kind of document (hereinafter also referred to as "document kind data") (e.g., document list, user list) that is to be output including items indicated in the document, data regarding output methods used when outputting the documents (hereinafter also referred to as "output method data") (e.g., printing, mail transmission, storage), and data regarding output conditions (hereinafter also referred to as "output condition data") (e.g., paper size, paper type, finishing). The document kind data, the output method data, and the output condition data in the document definition data 31 are defined in association to one another. Such document definition data 31 are prepared beforehand in correspondence with various output patterns (i.e. combinations of output methods and output conditions corresponding to the kinds of documents).

Accordingly, in the image processing apparatus 100 providing various output patterns for the user, the document defining part 23 manages the document definition data 31 in correspondence with the output patterns and determines suitable document definition data 31 according to a requested (instructed) output pattern. That is, the document defining part 23 identifies (selects) suitable document definition data 31 corresponding to a requested output pattern from the various document definition data 31.

The logical document fabricating part 24 is for fabricating the below-described logical document data by operating one or more logical document fabricating modules (logical document fabricating module) 32. The logical document fabricating part 24 manages the logical document fabricating modules 32, for example, by adding/deleting the logical document fabricating modules that fabricate document data in format(s) that do not depend on the output method or the output condition (logical document data).

The logical document fabricating modules 32 are prepared in correspondence with each document kind. Therefore, the document kind to be fabricated is determined by the logical document fabricating module 32 that is used in fabricating a document.

Accordingly, in the image processing apparatus 100 providing various output patterns for the user, the logical document fabricating part 24 manages the logical document fabricating modules 32 corresponding to the document kinds and determines a suitable document fabricating module 32 according to a requested (instructed) document kind. That is, the logical document fabricating part 24 identifies (selects) the document fabricating module 32 that fabricates logical document data corresponding to a requested document type from the various document definition data 31.

The physical document fabricating part 25 is for fabricating image data (image data to be output when outputting the document) based on the logical document data fabricated by the logical document module 32. That is, the physical document fabricating part 25 fabricates physical document data from the logical document data according to the output condition(s) corresponding to a desired output pattern.

The document outputting part 26 is for outputting the physical document data fabricated by the physical document fabricating part 25. That is, the document outputting part 26 outputs physical document data according to the output method corresponding to a desired output pattern.

The document outputting part 26 includes plural output function parts (in this embodiment, a printing part 26a, a mail transmitting part 26b, a storing part 26c) corresponding to each output method. Accordingly, in the image processing apparatus 100 providing various output patterns for the user, physical document data are output by one of the output function parts 26a, 26b, 26c corresponding to a designated output method.

In the image processing apparatus 100 according this embodiment, the printing part 26a is for printing data onto sheets of paper, the mail transmitting part 26b is for transmitting electronic mail to a desired destination, and the storing part 26c is for storing data in a storage device (e.g., HDD 110).

For example, in a case where the designated output method is "printing", the document outputting part 26 transmits physical document data together with corresponding output conditions to the printing part 26a and prints the physical document data onto a sheet of paper via the printing part 26a.

The functions of the function parts 21-26 are achieved by reading an image processing program from the ROM 105 to the RAM 106 and executing the image processing program with the CPU 108.

Next, the transmitting and receiving of data between the function parts 21-26 are described below.

The image processing apparatus 100 defines output patterns corresponding to each document kind beforehand and stores the defined output patterns as document definition data 31 therein. In outputting a document, the image processing apparatus 100 fabricates physical document data (image data of the document to be output) by using logical document data that are independent from output methods and output conditions of the document and outputs the document based on the fabricated physical document data in accordance with an output method and an output condition corresponding to selected document definition data 31.

<<Logical Document Data and Physical Document Data>>

Next, logical document data and physical document data fabricated by the image processing function according to an embodiment of the present invention are described.

FIG. 3A illustrates an example of logical document data D according to a first embodiment of the present invention. FIG. 3B illustrates an example of physical document data P according to the first embodiment of the present invention.

(Logical Document Data)

The logical document data D includes vector data which can have a sentence structure written (inserted) in a sentence by enclosing a part of the sentence with a special character string (referred to as a "tag") and can be written in a meta language capable of designating its unique tags. In FIG. 3A, structural items (e.g., "document name" and "report" illustrated in FIG. 3A) that are to be indicated in a document list are written with tags (e.g., "<tag>. . . </tag>", "<doc_name>. . . </doc_name>" illustrated in FIG. 3A) of XML (extensible Markup Language). Since logical document data D are written only with structural items of a document, the logical document data D do not rely on (independent from) output methods and output conditions of the document. Although FIG. 3A illustrates the logical document data D written with XML, the logical document data D may be written with other description languages as long as structural items of a document can be written in the form of structured data.

The logical document data D being written with such description language are interpreted by a parser corresponding to the description language and converted to predetermined data. In this embodiment, the physical document fabricating part 25 functions as the parser.

Thus, the logical document data D are in the form that can be generally used (general purpose) by an image processing function and not in the form of image data indicating the final visual layout of the document to be output.

(Physical Document Data)

On the other hand, as illustrated in FIG. 3B, physical document data P are in the form of image data indicating the final visual layout of the document to be output. That is, the physical document data P are fabricated by the physical document fabricating part 25 (parser capable of interpreting the description language of the logical document data D) based on the logical document data D in accordance with an output method and an output condition corresponding to a requested document.

An image processing apparatus according to a related art example performs a document outputting operation by collecting variable data of the items of a document and embedding the collected data in predetermined locations of prepared physical document data. Therefore, the image processing apparatus of the related art example is unable to adaptively output a document in correspondence with a desired output method and a desired output condition. The image processing apparatus according to an embodiment of the present invention has its image processing function divided into a function (logical document fabricating part 24) for fabricating the logical document data D consisting of data items of a requested document kind and a function (physical document fabricating part 25) for fabricating the physical document data P that reflect the output method and the output condition of the requested document. Thus, in a document outputting operation according to the image processing apparatus 100, a document can be adaptively output in correspondence with a desired output method and a desired output condition. That is, data fabrication can be controlled for adaptively outputting a document in correspondence with a desired output method and a desired output condition.

<<Document Outputting Function>>

Next, a document outputting operation by the image processing apparatus 100 according to an embodiment of the present invention is described in the following order:

(1) Register document definition data 31 and logical document fabricating module 32
(2) Select output pattern
(3) Set condition for outputting document
(4) Fabricate logical document data D
(5) Fabricate physical document data P and output document

[Establishing Environment for Document Output]

An environment for outputting a document is established by installing the document definition data 31 and the logical document fabricating modules 32 in the image processing apparatus 100 according to an embodiment of the present invention.

(1) Registering of Document Definition Data and Logical Document Fabricating Module FIG. 4 is a schematic diagram illustrating processes (steps) for registering the document definition data 31 and the logical document fabricating modules 32 according to the first embodiment of the present invention.

When a document function providing module M is installed in the image processing apparatus 100, the document function providing module M is activated to allow the document definition data 31 and the logical document fabricating modules 32 to be installed.

The document function providing module M includes, for example, a plug-in module that can be discretionally installed in/uninstalled from a software environment of the image processing apparatus 100. By discretionally installing/uninstalling the document function providing module M, the document outputting function of the image processing apparatus 100 can easily adapt to changes of data (e.g., new data in a case where new data are included in a structural item of a document) stored in the image processing apparatus 100.

The document function providing module M includes the document definition data 31 and the logical document fabricating modules 32. The document definition data 31 include new definition data corresponding to new kinds of documents which are to be provided to the image processing apparatus 100.

Taking the above into consideration, an operation for registering the document definition data 31 and the logical document fabricating module 32 is described as follows.

First, the document function providing module M installed in the image processing apparatus 100 is activated (Step S101). Then, the document function providing module M transmits document definition data 31 corresponding to the kind of the document to be provided to the document defining part 23 and requests for the document definition data 31 to be registered (Step S102). Then, in accordance with the registration request, the document defining part 23 registers the received document definition data 31 in the image processing apparatus 100 by storing the document definition data 31 in a predetermined storage space of a storage device such as the HDD 110 (Step S103).

Further, the document function providing module M transmits the logical document fabricating module 32 corresponding to the kind of the document to be provided to the logical document fabricating part 24 and requests for the logical document fabricating module 32 to be registered (Step S104). Then, in accordance with the registration request, the logical document fabricating part 24 registers the received logical document fabricating module 32 in the image processing apparatus 100 by storing the logical document fabricating module 32 in a predetermined storage space of a storage device such as the HDD 110 (Step S105).

Thereby, the document definition data 31 and the logical document fabricating module 32 required for outputting a new kind of document (new document kind) can be registered. In the registering operation, the logical document fabricating module 32 is uniquely registered so that the logical document fabricating module 32 can be identified based on identification data of a corresponding document kind. For example, the image processing apparatus 100 may include management data that associate identification data of a document kind(s) and storage destination data of a logical document fabricating module(s) 32 (data indicating the destination in which the logical document fabricating module 32 is to be stored). Accordingly, the image processing apparatus 100 can update the management data when registering the logical document fabricating module 32.

(Data Regarding Document Outputting)

Figure 5:
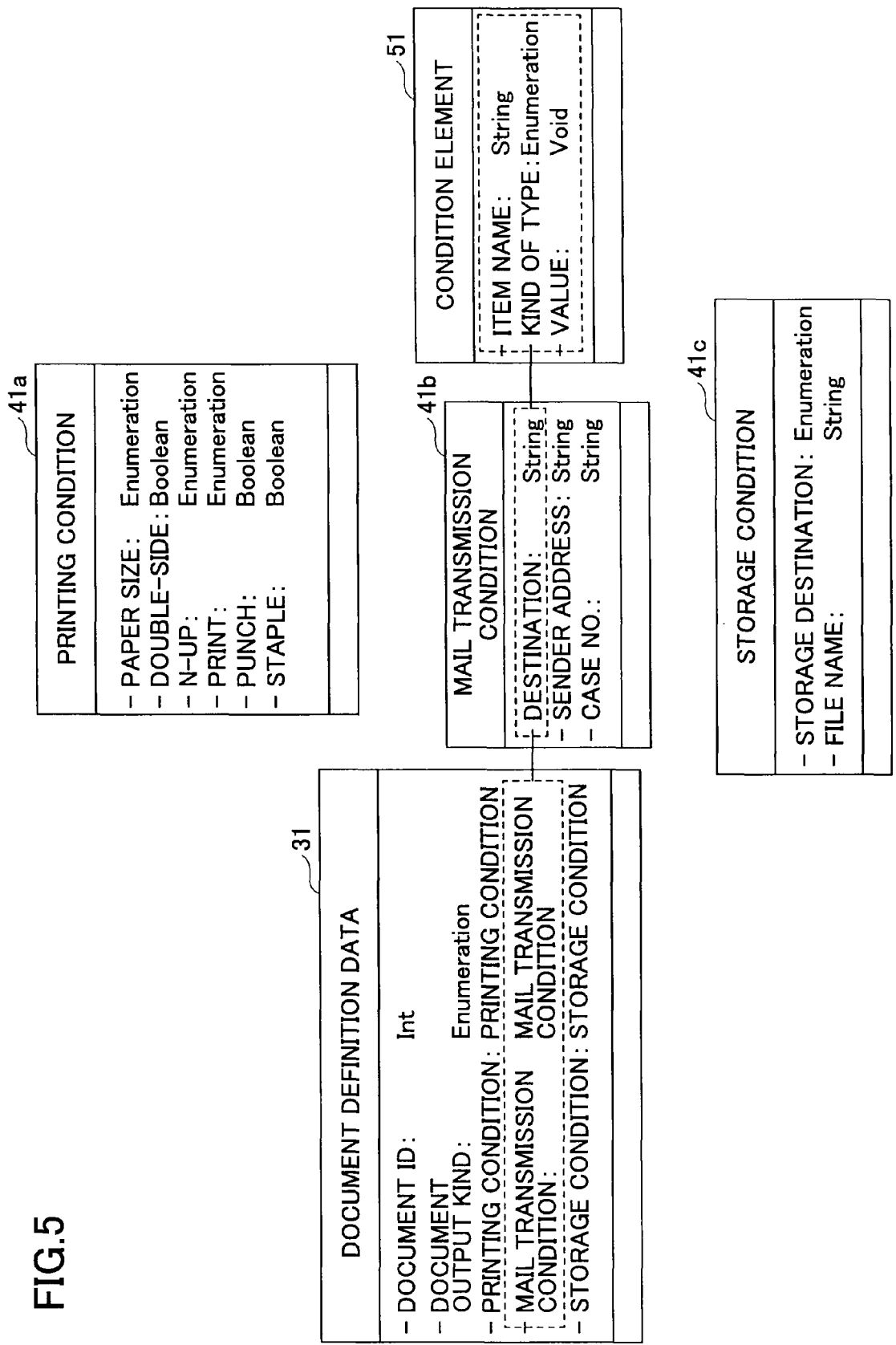
FIG. 5 is for describing configurations of data regarding document outputting according to an embodiment of the present invention.

Next, data regarding document outputting (being managed by the image processing apparatus 100) are described. FIG. 5 is for describing configurations of data regarding document outputting according to the first embodiment of the present invention.

FIG. 5 illustrates a configuration of the document definition data 31 into which data regarding document outputting can be defined. The document definition data 31 are configured to include definitions of the output method and the output condition 41 in correspondence with each document kind. For example, "document ID" (data for identifying the kind of document (document kind)) and "document output kind" (data for identifying the method for outputting a document) are provided in the document definition data 31 in association with "output condition" (data indicating the condition(s) for outputting a document)". Further, in a case where the output method is "printing", the corresponding output condition is "printing condition 41*a*". In a case where the output method is "mail transmission", the corresponding output condition is "mail transmission condition 41*b*". In a case where the output method is "storage", the corresponding output condition is "storage condition 41*c*".

FIG. 5 also illustrates a data configuration of "printing condition 41*a*" where the output method is "printing". FIG. 5 also illustrates a data configuration of "mail transmission condition 41*b*" where the output method is "mail transmission". FIG. 5 also illustrates a data configuration of "storage condition 41*c*" where the output method is "storage".

The output conditions 41 have a generalized data configuration as illustrated in FIG. 5 (41*a*-41*c*) The output conditions 41 include data items indicating output conditions corresponding to each output method. For example, in a case where the output method is "printing", the output condition 41 (in this case, printing condition 41*a*) would include data items as "paper size" or "double-side". Further, the output condition 41 includes one or more condition elements 51 that are defined with the same format (described in detail below).

By being able to define the condition elements 51 with the above-described data configuration, there is no need to change data operating methods or software components even in a case where new output methods are added or where output conditions 41 of existing output methods are changed.

The condition element 51 included in the output condition 41 has a data configuration illustrated in FIG. 5. In this embodiment, the condition element 51 includes "item name" (data indicating the name of an item of the output condition 41), "kind of data type" (data indicating the kind of data type of an output condition value), and "value" (data indicating the output condition value). The data items included in the condition element 51 can be defined according to a predetermined data type.

Accordingly, with the image processing apparatus 100 according to this embodiment, an output method corresponding to each document kind and one or more output conditions 41 corresponding to each output method can be defined in a single document definition data set 31. Thus, plural document definition data sets of various output patterns can be registered with respect to a single document type. In the image processing apparatus 100 according to this embodiment, the UI part 21 displays a control panel (not illustrated) enabling registration/deletion/editing of the document definition data 31 on the display device 102. The user operates on (manipulates) the document definition data 31 via the control panel.

[Execution of Document Outputting]

The image processing apparatus 100 according to this embodiment outputs a kind of document designated by the user according to a document output request from the user.

(2) Selection of Output Pattern (Notification of Output Pattern Candidates)

The image processing apparatus 100 according to this embodiment presents one or more output patterns that can be selected as output patterns (referred to as "output pattern candidates") to the user when receiving a document output request from the user.

Figure 6A:
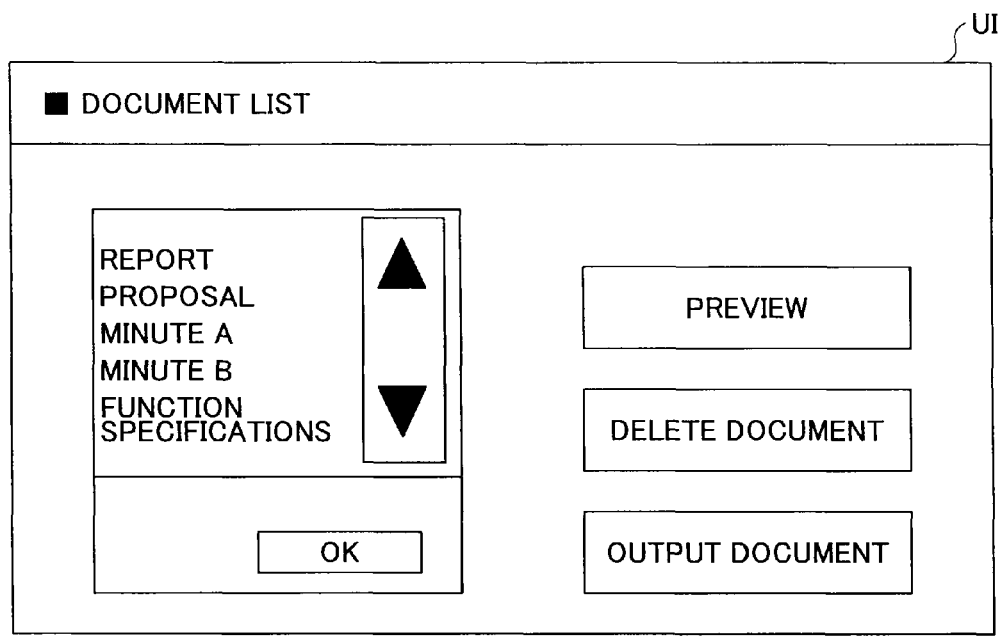
FIG. 6A illustrates an example of a control panel for operating on document data managed by an image processing apparatus according to an embodiment of the present invention.
Figure 6B:
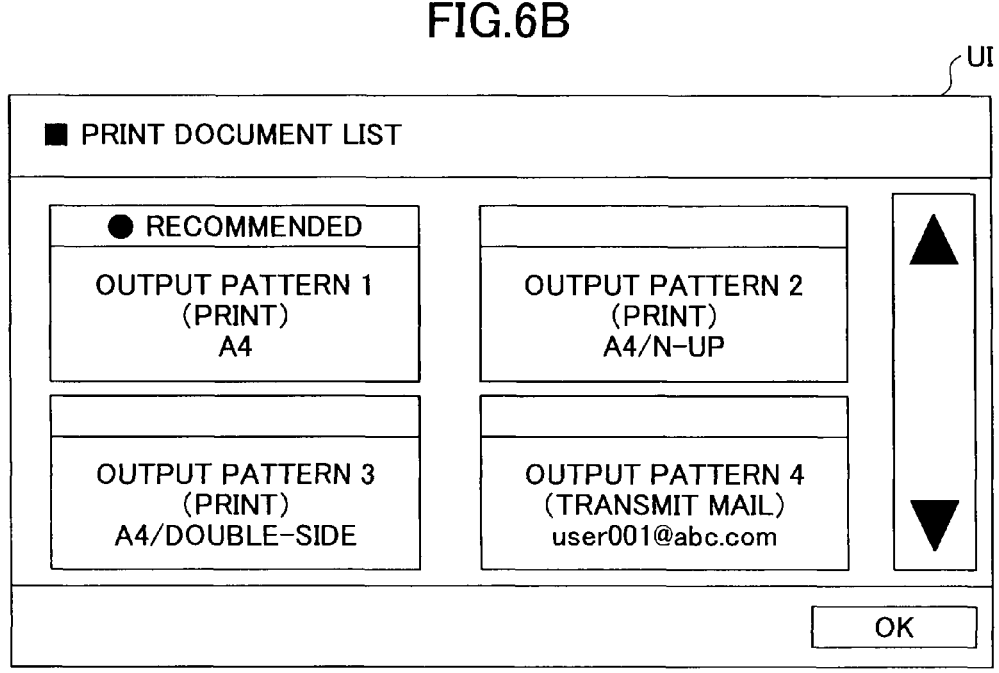
FIG. 6B illustrates an example of a control panel for printing a document list with an image processing apparatus according to an embodiment of the present invention.

FIGS. 6A and 6B are for describing an exemplary case of outputting a document using a UI screen according to the first embodiment. FIG. 6A illustrates an example of a control panel UI for operating on document data managed by the image processing apparatus 100. FIG. 6B illustrates an example of the control panel UI for printing a document list with the image processing apparatus 100.

With reference to FIG. 6A, first, the user selects a "document output" button displayed in the control panel UI for requesting (instructing) the image processing apparatus 100 to output a document list. When the image processing apparatus 100 receives the output request via the UI part 21, the image processing apparatus 100 displays the control panel UI on the display device 102. In this case, output pattern candidates for outputting a document list are shown in the control panel UI. Thereby, the user can select a desired output pattern via the control panel UI and designate the output method and output condition(s) 41 for performing the document output.

Next, processes for notifying output pattern candidates according to the first embodiment are described.

FIG. 7 is a schematic diagram illustrating processes for notifying (reporting) output pattern candidates according to the first embodiment.

When the image processing apparatus 100 receives a document output request from the user via the UI part 21 (that is, when the "output document" button of FIG. 6A is pressed), the UI part requests outputting of a document by transmitting a document ID designated along with the document output request to the document output controlling part 22 (Step S201).

Then, the document output controlling part 22 requests obtaining of corresponding document definition data by transmitting the document ID transmitted from the UI part 21 (Step S202). The document defining part 23, in accordance with the request from the document output controlling part 22, searches through all of the registered document definition data 31 (i.e. document definition data 31 stored in the HDD 110) based on the document ID and transmits the document definition data 31 corresponding to the document ID to the document output controlling part 22 (Step S203).

Then, the document output controlling part 22 notifies the UI part 21 to display a combination(s) of an output method and an output condition 41 corresponding to the obtained document definition data 31 as an output pattern candidate(s) (Step S204).

Then, the UI part 21 displays the output pattern candidate(s) registered in correspondence with the kind of document designated for output by the user on the display device 102 (i.e. displays the control panel UI illustrated in FIG. 6B). After a selection of the candidates is made by the user (i.e. after the "output pattern" button of FIG. 6B is selected), the UI part 21 transmits the result of the selection to the document output controlling part 22 (Step S205).

Thereby, document output can be easily performed in accordance with a desired output method and a desired output condition 41 by registering output patterns corresponding to document definition data 31 and enabling the user to a select a desired output pattern corresponding to a document desired to be output. In other words, with the above-described embodiment of the image processing apparatus 100, the burden of complicated settings of output methods and output conditions for outputting a document can be reduced and a document outputting function having satisfactory operability can be attained.

(Displaying of Output Pattern Candidates)

In a case of presenting output pattern candidates to the user, the image processing apparatus 100 displays a recommended output pattern on the control panel UI (see "output pattern 1" button illustrated in FIG. 6B). An administrator defines a recommended output pattern corresponding to each kind of document to the document definition data 31 and registers the document definition data 31. Thereby, even if the user is not accustomed to using the document outputting function of the image processing apparatus 100, the user can easily output a document.

Further, the control panel UI as illustrated in FIG. 6B may be displayed in correspondence with each user based on log-in data of the user. In this case, the document defining part 23 manages the document definition data 31 in correspondence with each user (stores the document definition data 31 in correspondence with each user in a storage area).

The UI part 21 may display the output pattern candidates in an order based on additional information rather than displaying the output pattern candidates in accordance with the order in which the document definition data are registered. For example, the additional information may be the frequency of using the output patterns, the history of using the output patterns, or a priority order prepared beforehand. In this case, the UI part 21 receives the additional information along with a request to display the output pattern candidates from the document output controlling part 22. Further, in this case, the document output controlling part 22 updates the additional information according to the output pattern selection result transmitted from the UI part 21. Accordingly, even in a case where the output pattern candidates are so many that they cannot all be displayed on a single screen, the control panel UI can present suitable output pattern candidates from the many output pattern candidates and enable the user to efficiently select a desired output pattern.

Further, in the step where the document output controlling part 22 notifies (reports) output pattern candidates to the UI part 21 based on the document definition data 31, the document output controlling part 22 may also determine whether the output pattern of the output pattern candidates can be operated on by the current image processing apparatus 100. Therefore, in a case where the output pattern candidates include an output pattern(s) that cannot be operated on by the image processing apparatus 100, the document output controlling part 22 may notify (report) that such output pattern(s) is included in the output pattern candidates to the UI part 21. Alternatively, the document output controlling part 22 may refrain from notifying (reporting) the output pattern candidate corresponding to such output pattern(s). In determining whether the output pattern(s) can be operated on by image processing apparatus 100, the document output controlling part 22 may make the determination according to the status of an option device(s) (not illustrated) attached to the image processing apparatus 10 or the operating status of functions of the image processing apparatus 10 based on status information of the image processing apparatus 100 (e.g., MIB (Management Information Base) and a system log (including error logs). Accordingly, the user can be prevented from selecting an output pattern that cannot be operated on by the image processing apparatus 100.

(3) Setting Conditions of Document Outputting

The image processing apparatus 100 controls the performing of the document outputting operation based on an output method and output conditions 41 corresponding to an output pattern selected by the user. In this embodiment, the document output controlling part 22 refers to the output pattern selection results received from the UI part 21 and obtains output conditions 41 from the document definition data 31 corresponding to the output pattern selected by the user. Then, the document output controlling part 22 sends the obtained output conditions 41 to the physical document fabricating part 25 and the document outputting part 26. Accordingly, the physical document fabricating part 25 fabricates physical document data P based on the received output conditions 41. The document outputting part 26, in accordance with a designated output method, outputs a document (document output) based on the received output conditions 41.

In this embodiment, the output conditions 41 defined in the document definition data 31 include two kinds of conditions in which one of the kinds is used for fabricating the physical document data P (physical document data fabricating conditions) and the other is used for outputting the physical document data P according to a designated output method (physical document data outputting conditions).

The physical document data fabricating conditions include operating conditions regarding image processing. Thus, in a case where the physical document fabricating part 25 fabricates the physical document data P (i.e. image data), the physical document fabricating part 25 fabricates the physical document data P by performing an image process using predetermined image processing conditions (e.g., conditions for rotating an image or changing the scale of an image). For example, in a case where the designated output method is "printing" and the printing condition 41a is "n-up", the physical document fabricating part 25 rotates and reduces the size of an image to fabricate an n-up image (Nin1).

Further, physical document data outputting conditions include operating conditions regarding outputting processes (e.g., printing, mail transmission, storage). Thus, in a case where the document outputting part 22 outputs a document according to a designated output method, the document outputting part 22 outputs the document by performing an output process using predetermined output conditions. For example, in a case where the designated output method is "printing" and the printing condition 41a is "paper size: A4", an A4 size paper is fed from a sheet-feed tray (not illustrated) of the image processing apparatus 100 and document data are printed onto the A4 size paper.

As described above, the processes performed by the physical document fabricating part 25 and the document outputting part 22 are controlled according to control values of the output conditions 41 defined in the document definition data 31. Thereby, the physical document data P are fabricated and a document based on the fabricated physical document data P is output.

Furthermore, the physical document fabricating part 25 may perform image processing according to or together with control values other than the control values of the output conditions 41 defined in the document definition data 31.

In a case of fabricating the physical document data P where the output method is "printing", the physical document fabricating part 25 fabricates the physical document data P considering, for example, an aspect of preventing data from being lost due to inconsistency of paper size, an aspect of visibility of data, or an aspect of listing properties of data.

For example, in a case of fabricating the physical document data P where the output method is "printing", the size of paper onto which image data are printed (printing area) may not suit the size of an image area of the physical document data P fabricated by the physical document fabricating part 25. For example, loss of data occurs when a document is output in a manner where a part of an image area of the physical document data P is not printed on the printing area of the paper in a case where the image area is larger than the printing area. Therefore, in a case where the image area is larger than the printing area, the physical document fabricating part 25 in this embodiment fabricates image data according to one of the following operation controlling methods which are "print by reducing number of data items", "print by reducing size", and "print by indenting".

Next, the three operation controlling methods are described with reference to FIGS. 8A-10B.

(In a Case of Printing by Reducing Number of Data Items)

FIG. 8A illustrates an example of the physical document data P of a "document list" fabricated by the physical document fabricating part 25. FIG. 8B illustrates an example of another physical document data P1 fabricated in a manner having its data items reduced by the physical document fabricating part 25. In this manner, the physical document fabricating part 25 can fabricate the physical document data set P1 that include only predetermined data items with respect to the kind of document designated to be output. Whether to include the data items in the physical document data P1 may be determined according to, for example, the importance of the data items.

(In a Case of Printing by Reducing Size)

FIG. 9A illustrates an example of the physical document data P of a "document list" fabricated by the physical document fabricating part 25. FIG. 9B illustrates an example of another physical document data set P2 fabricated in a manner having its size reduced by the physical document fabricating part 25. In this manner, the physical document fabricating part 25 can fabricate the physical document data P2 having a reduced size matching the size of the paper to which the document is output.

(In a case of Printing by Indenting)

FIG. 10A illustrates an example of the physical document data P of a "document list" fabricated by the physical document fabricating part 25. FIG. 10B illustrates an example of another physical document data set P3 fabricated in a manner having parts of the document data P indented by the physical document fabricating part 25. In this manner, the physical document fabricating part 25 can indent data items that may protrude from the printing area of the paper.

Figure 11:
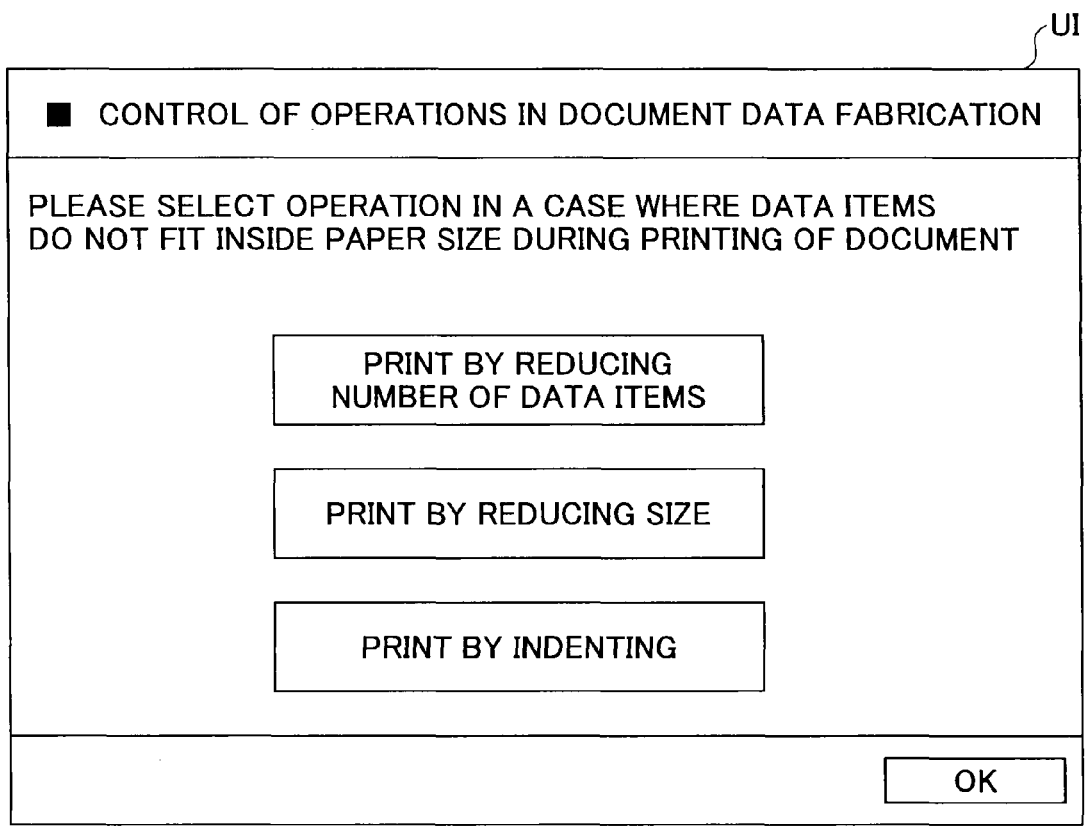
FIG. 11 is a schematic diagram illustrating an example of a screen of the control panel in a case of outputting a document according to an embodiment of the present invention.

Hence, the UI part 21 displays the above-described operation controlling methods performed by the physical document fabricating part 25 on the control panel UI as illustrated in FIG. 11.

FIG. 11 is a schematic diagram illustrating an example of a screen of the control panel UI in a case of outputting a document according to an embodiment of the present invention. The user or administrator can select the method for controlling operations by the physical document fabricating part 25 via the control panel UI. Thus, upon receiving a selection of one of the operations at the UI part 21, the operation of the physical document fabricating part 25 is controlled according to a control value corresponding to the selected operation. In this embodiment, in a case where the output method is "printing", the physical document fabricating part 25 outputs appropriate physical document data P matching the printing area of the paper.

Figure 12:
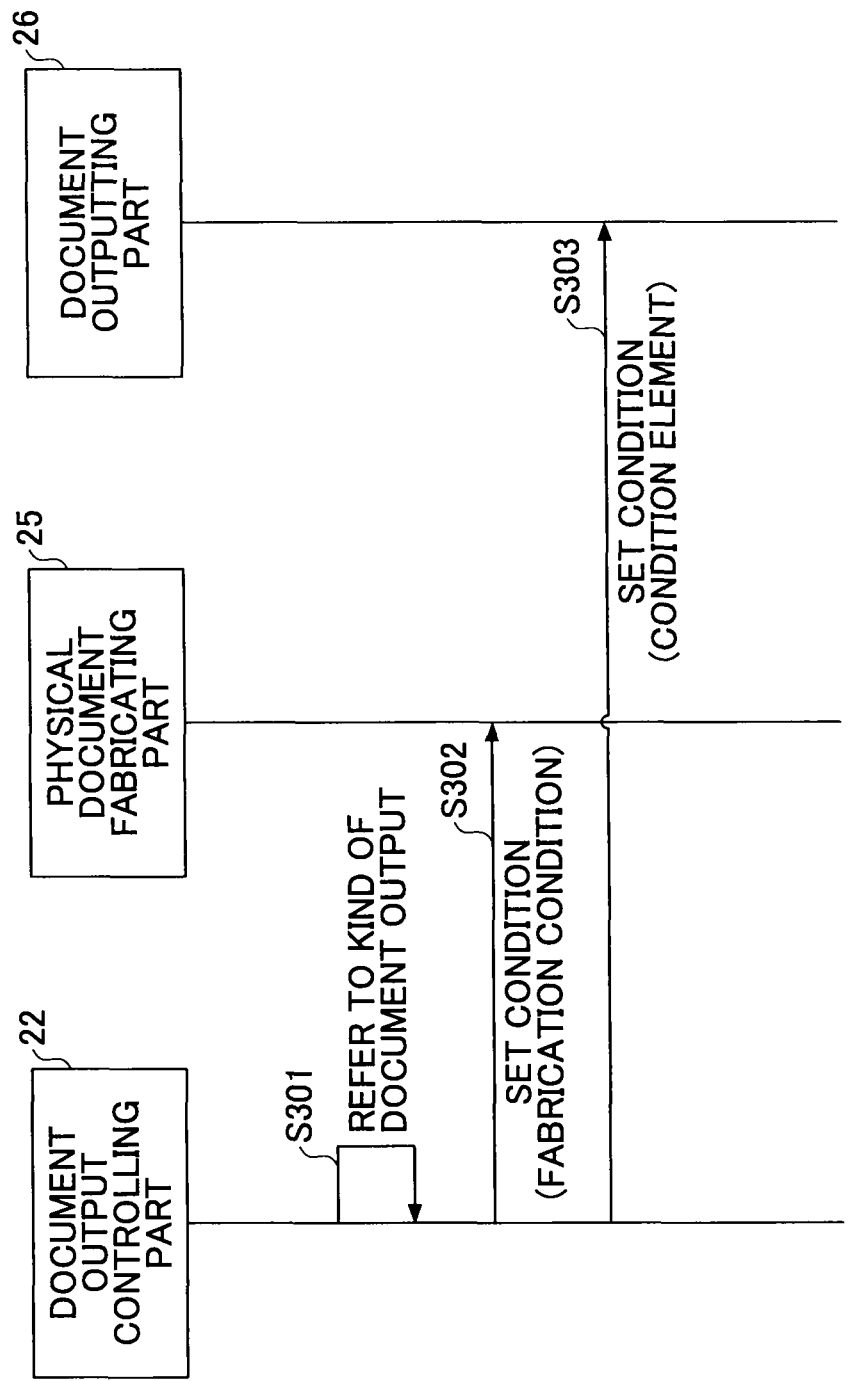
FIG. 12 is a schematic diagram illustrating the processes for setting the conditions for outputting a document according to an embodiment of the present invention.

Next, the processes for setting the conditions for outputting a document are described with reference to FIG. 12. FIG. 12 is a schematic diagram illustrating the processes for setting the conditions for outputting a document according to the first embodiment of the present invention.

When a result of an output pattern selected by the user (output pattern selection result) is transmitted to the document output controlling part 22 (corresponding to Step S205 of FIG. 7), the document output controlling part 22 refers to the kind of document output corresponding to the document definition data 31 including the definition of the selected output pattern (Step S301). In this manner, the image processing apparatus 100 is informed of the designated output method.

Then, the document output controlling part 22 sets operating conditions of the physical document fabricating part 25 by sending control values of each condition element 51 of the output conditions 41 defined in a corresponding document definition data set 31 to the physical document fabricating part 25. Furthermore, in a case where the output method is "printing", the document output controlling part 22 sets the conditions for fabricating the physical document data P by sending predetermined control values of an operation control method of the physical document fabricating part 25 (Step S302).

Then, the document output controlling part 22 sets the output conditions 41 by sending the condition element 51 of the output conditions 41 together with a designation of an output method to the document outputting part 26 (Step S303). In a case where the output conditions 41 consists of plural condition elements 51, the document output controlling part 22 repeats the processes performed in Step S302 and S303 in a number of times corresponding to the number of the plural condition elements 51. Thus, the processes for setting the conditions for fabricating the physical document data P and the conditions for outputting a document are completed when all of the condition elements 51 are sent to corresponding function parts 25 and 26.

Accordingly, with the image processing apparatus 100 of this embodiment, conditions for outputting a document can be set and a document can be output based on the document definition data 31 in accordance with an output pattern designated by the user.

(4) Fabricating Logical Document Data

After the document output controlling part 22 sets the operating conditions of the physical document fabricating part 25 and the document outputting part 26, the document output controlling part 22 requests the logical document fabricating part 24 to fabricate logical document data D based on the kind of document designated for output.

Figure 13:
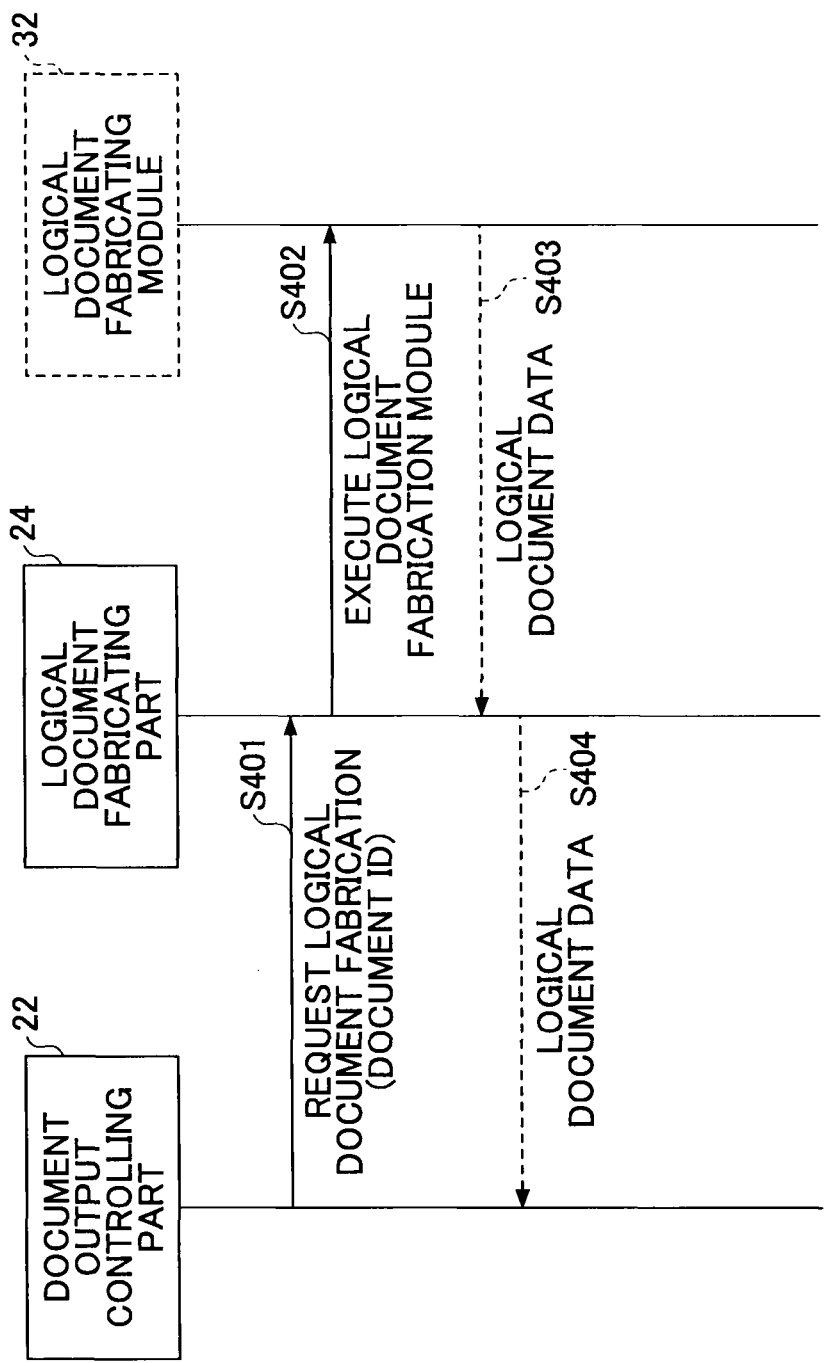
FIG. 13 is a schematic diagram illustrating the processes for fabricating logical document data according to an embodiment of the present invention.

Next, the processes for fabricating logical document data D are described with reference to FIG. 13. FIG. 13 is a schematic diagram illustrating the processes for fabricating the logical document data D according to the first embodiment of the present invention.

The document output controlling part 22 requests the logical document fabricating part 24 to fabricate logical document data D by transmitting a document ID transmitted from the UI part 22 to the logical document fabricating part 24 (Step S401). In accordance with the request, the logical document fabricating part 24 identifies a corresponding logical document fabricating module 32 from the logical document fabricating modules 32 stored in the HDD 110 (registered logical document fabricating modules) by referring to the transmitted document ID and executes the identified logical document fabricating module 32 (Step S402).

Accordingly, the logical document module 32 fabricates the logical document data D corresponding to the kind of document designated to be output and transmits the fabricated logical document data D to the logical document fabricating part 24 (Step S403). Then, the logical document fabricating part 24 transmits the received logical document data D to the document output controlling part 22 (Step S404).

By executing the logical document fabricating module 32 corresponding to the kind of document designated to be output from the logical document fabricating modules 32 stored in the HDD 110 beforehand, suitable logical document data D can be fabricated. As described above, the fabricated logical document data D are independent from the output method and the output conditions 41 of a document.

(5) Fabricating Physical Document Data and Outputting a Document

When the logical document data D are fabricated, the document output controlling part 22 requests the physical document fabricating part 25 to fabricate physical document data P based on the fabricated logical document data D. Further, the document output controlling part 22 requests the document outputting part 26 to output a document.

Figure 14:
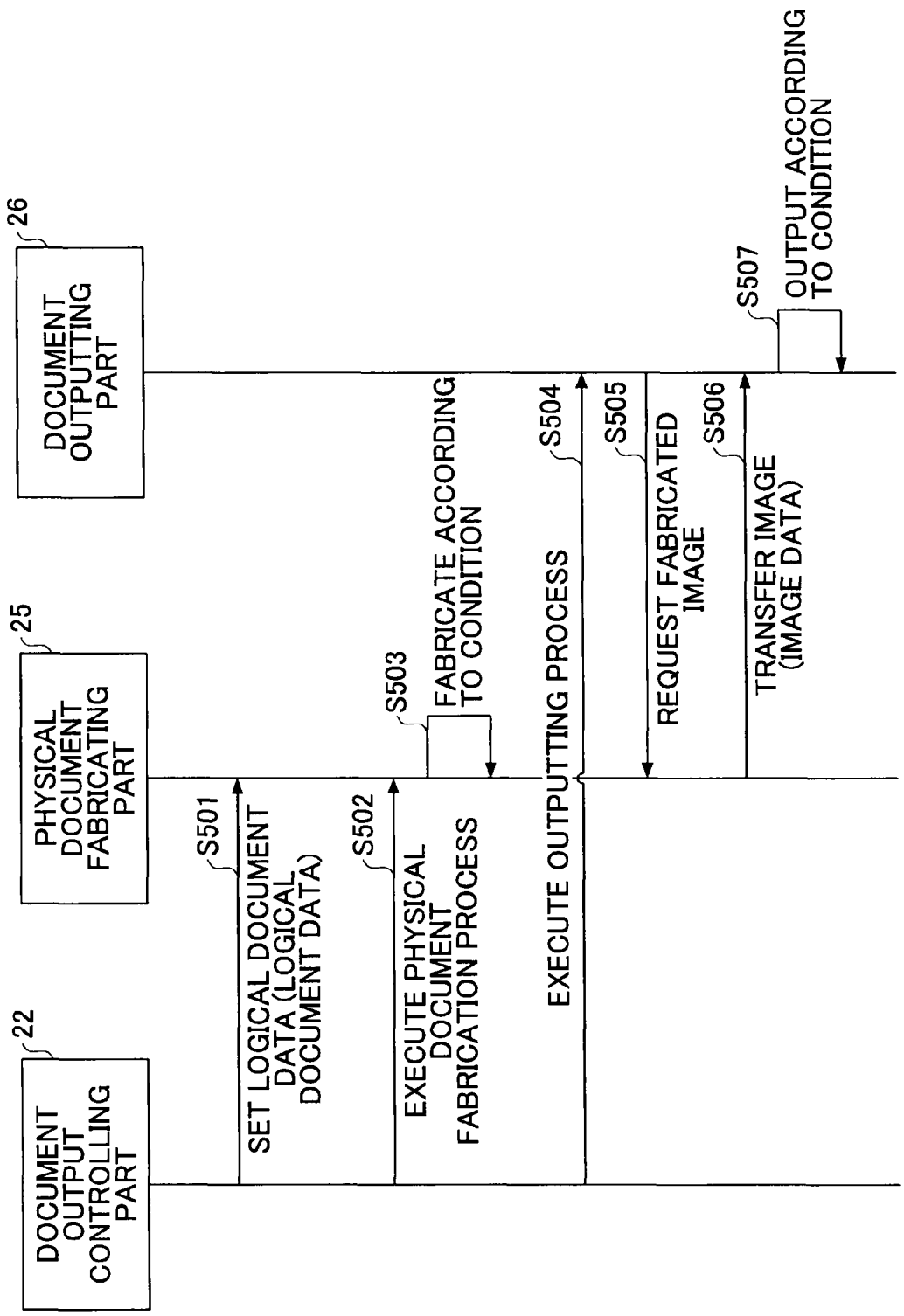
FIG. 14 is a schematic diagram illustrating the processes for fabricating physical document data and outputting a document according to an embodiment of the present invention.

Next, the processes for fabricating physical document data P and outputting a document are described with reference to FIG. 14. FIG. 14 is a schematic diagram illustrating the processes for fabricating physical document data P and outputting a document according to the first embodiment of the present invention.

The document output controlling part 22 transmits the fabricated logical document data D to the physical document fabricating part 25 and thereby sends original data of a document to be output to the physical document fabricating part 25 (Step S501). Then, the document output controlling part 22 requests the physical document fabricating part 25 to fabricate physical document data P (Step S502).

Accordingly, the physical document fabricating part 25 fabricates physical document data P from the logical document data D according to operating condition settings (e.g., output conditions 41 control values of operation control methods) (Step S503). Then, the above-described image processing process is performed.

When the physical document data P are fabricated, the document output controlling part 22 requests the document outputting part 26 to output a document (outputting process) (Step S504).

The document outputting part 26, receiving a request to execute an outputting process, requests the physical document fabricating part 25 to transfer the fabricated physical document data P (Step S505). Then, the physical document fabricating part 25 transfers the physical document data P to the document outputting part 26 (Step S506).

Accordingly, the document outputting part 26 outputs a document by using the physical document data P in accordance with a designated output method and operating condition settings (output condition 41) (Step S507). In this step, the document outputting part 26 outputs a document with one of the printing part 26*a*, the mail transmitting part 26*b*, and the storing part 26*c* according to a designated output method.

Thus, with the above-described embodiment of the image processing apparatus 100, physical document data (image data) P are fabricated according to a fabricating condition(s) by using the logical document data D (vector data) that are independent from the output method and the output conditions of a document; thereby, the document can be output according to the output method and the output conditions by using the fabricated physical document data P.

With the above-described embodiment of the image processing apparatus 100, an output pattern can easily be designated by simply selecting pre-registered document definition data 31. Further, by fabricating a generalized (general purpose) format such as the logical document data D, a document corresponding to the output method and the output conditions 41 can be output.

Hence, with the above-described embodiment of the image processing apparatus 100, satisfactory operability can be attained when outputting a document, and a document can be adaptively output according to the output method and the output condition 41.

[Second Embodiment]

In the first embodiment, a document is output with physical document data (image data) by the document outputting part according to the output method and output condition of the document.

The printing part, for example, functions when "printing" is designated as the output method. The printing part outputs a document by printing the physical document data on a designated sheet of paper according to a corresponding output condition. In a case where a printer engine that controls the printing part is applicable to full color images of a CMYK color space, the physical document data transmitted from the physical document fabricating part to the document outputting part is to correspond to the CMYK color space. However, the physical document fabricating part not only fabricates physical document data of a color space corresponding to an output method of printing but also other output methods such as mail transmission and storage. Therefore, in a case where the physical document data are fabricated in an RGB color space, the physical document data may need to be converted into CMYK color space data interpretable (comprehensible) for the printer engine before the physical document data are transmitted to the document outputting part.

In a case where "mail transmission" or "storage" is designated as the output method, the amount of physical document data fabricated by the physical document fabricating part may become a problem.

For example, in a case of the mail transmitting part, mail attached with the physical document data is transmitted to a given address. Thus, in a case where the size (data size) of the physical document data is large, the physical document data may adversely affect the communication speed of the telecommunication network connected to the image processing apparatus. The same applies to a case where the output method is "storage". In a case where the size (data size) of the physical document data is large, the physical document data may adversely affect to storage apparatus (e.g., HDD) where the physical document data are to be stored. Therefore, the physical document data may need to be compressed before the physical document data are transmitted to the document outputting part.

Therefore, in the second embodiment, the above-described difficulties can be resolved by providing an image converting function that can convert the color of physical document data or compress the physical document data.

<Image Processing Function>

Next, an image processing function of the image processing apparatus 100 according to the second embodiment of the present invention is described.

<<Configuration of Each Component for Achieving Image Processing Function>>

Figure 15:
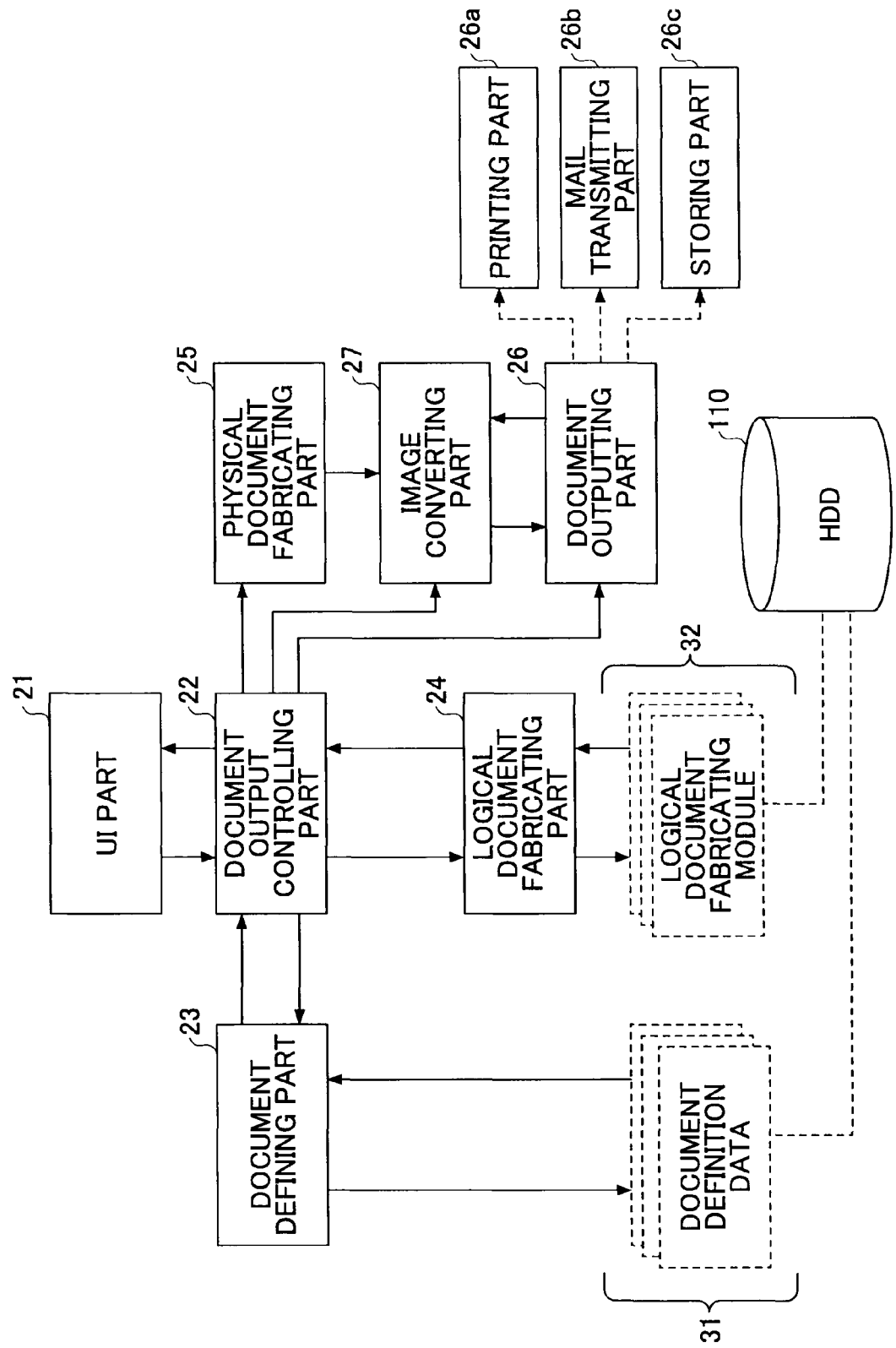
FIG. 15 is a schematic diagram illustrating a configuration of image processing function parts according to an embodiment of the present invention.

FIG. 15 is a schematic diagram illustrating a configuration of the image processing function parts according to the second embodiment of the present invention. In addition to function parts such as the UI part 21, the document outputting part 22, the document defining part 23, the logical document fabricating part 24, the physical document fabricating part 25, and the document outputting part 26, the image processing apparatus 100 of the second embodiment includes an image converting part 27. Thus, the image processing apparatus 100 of the second embodiment can provide the document output function in various output patterns for the user.

The functions of the above-described function parts are achieved by reading an image processing program (software component) from the ROM 105 to the RAM 106 and executing the program with the CPU 108.

The image converting part 27 is for performing color conversion or data compression on the physical document data P. In a case where the output method is "printing", the image converting part 27 converts a color space of the physical document data P fabricated by the physical document fabricating part 25 to a color conversion corresponding to the printer engine that controls the printing part 26a (e.g., color conversion from RGB to CMYK). Then, the image converting part 27 transmits the color converted data to the document outputting part 26. Further, in a case where the output method is "mail transmission" or "storage", the image converting part 27 may convert the color space of the physical document data P fabricated by the physical document fabricating part 25 to a data format that can be compressed (e.g., converting bitmap data into JPEG (Joint Photographic Experts Group) data or TIFF (Tagged Image File Format) data). Then, the image converting part 27 transmits the converted data to the document outputting part 26.

The image converting part 27 according to an embodiment of the present invention performs the color conversion based on the below-described image related data.

(Image Related Data)

Next, image related data according to an embodiment of the present invention are described with reference to FIG. 16.

Figure 16:
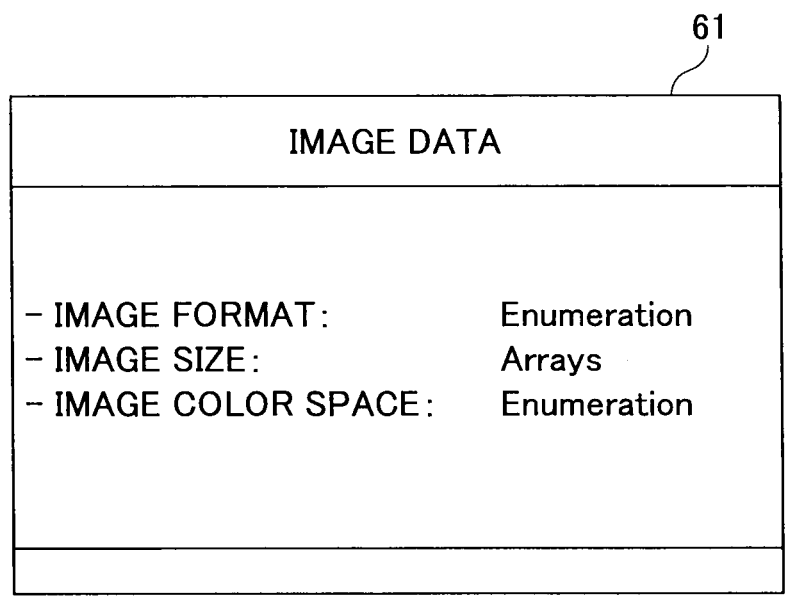
FIG. 16 is a schematic diagram illustrating a data configuration of image related data according to an embodiment of the present invention.

FIG. 16 is a schematic diagram illustrating a data configuration of image related data according to an embodiment of the present invention.

FIG. 16 illustrates image related data having a configuration that can be defined as image data 61. The image data 61 include data related to an image of the physical document data P, image related data used in converting an image in correspondence with the output method of the document. For example, the image data 61 has a configuration enabling "image format" data (data regarding the data format of an image), "image size" data (data regarding array of data indicating an image size (image area size) represented by the number of vertical/horizontal pixels, and "image color space" data (data regarding the color space of an image).

The same as the document definition data 31, the image data 61 has a generalized configuration as illustrated in FIG. 5.

The image data are generated by the physical document fabricating part 24 and the document outputting part 26. The physical document fabricating part 24 generates the image data 61 of the fabricated physical document data P and transmits the image data 61 together with the fabricated physical document data P to the image converting part 27. The document outputting part 26 generates image data 61 defined by image conversion conditions corresponding to the output method of the document and transmits the generated image data 61 to the image converting part 27.

Accordingly, the image converting part 27 performs a predetermined image converting process on the physical document data P based on the image data 61.

<<Document Outputting Function>>

Next, an image converting process performed in a document outputting operation according to an embodiment of the present invention is described. (Generation of physical document data and document output)

After the fabrication of physical document data P, the physical document generating part 25 transmits the physical document data P to the image converting part 27. Then, the image converting part 27 performs an image converting process on the physical document data P based on the image data 61. Accordingly, the document outputting part 26 outputs a document based on the image converted physical document data P.

Figure 17:
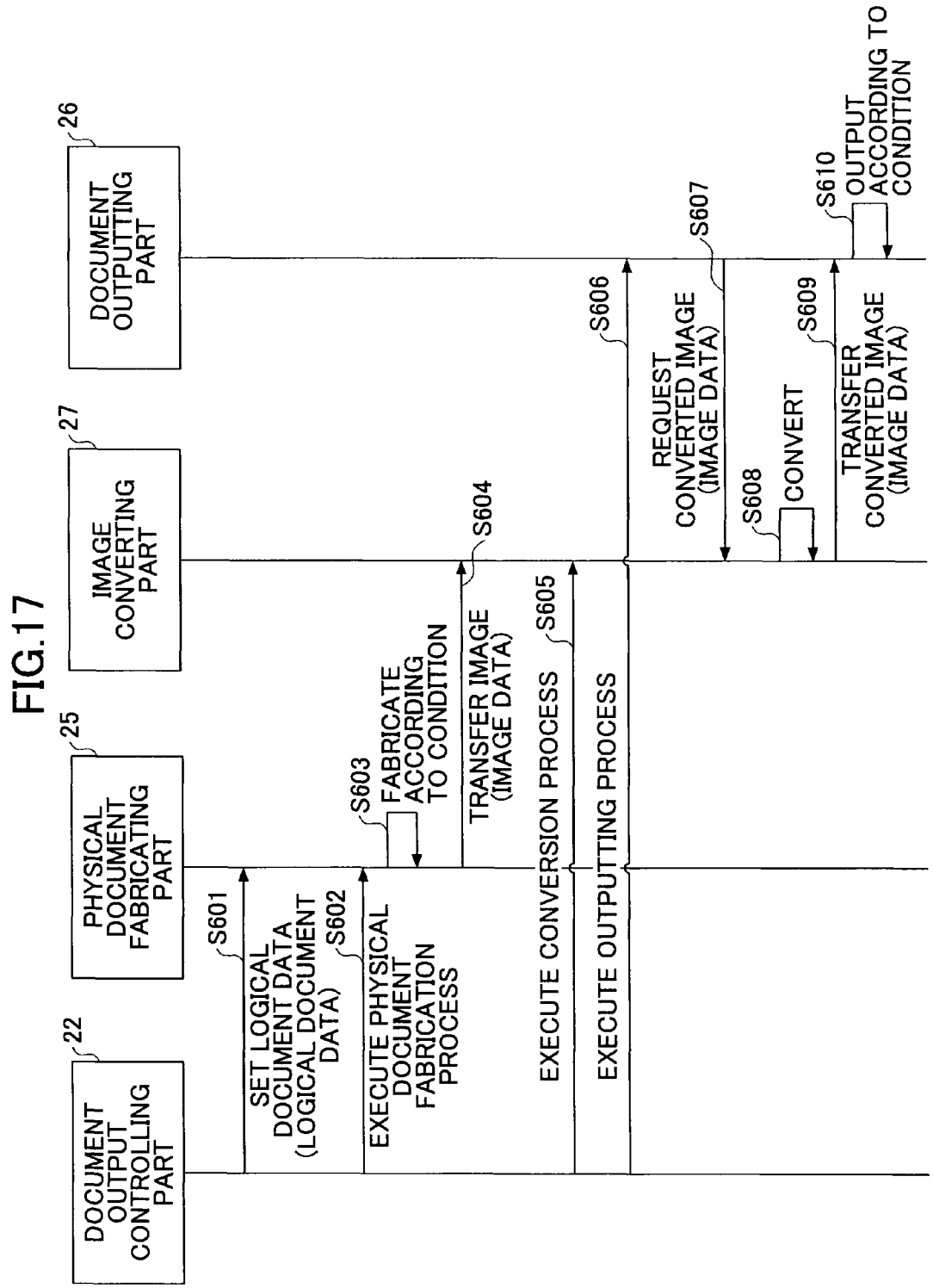
FIG. 17 is a schematic diagram illustrating the processes for fabricating physical document data and outputting a document are described according to an embodiment of the present invention.

Next, the processes for fabricating the physical document data P and outputting a document are described according to an embodiment of the present invention. FIG. 17 is a schematic diagram illustrating the processes for fabricating the physical document data P and outputting a document are described according to an embodiment of the present invention. The processes performed in Step S601 through S603 in FIG. 17 are basically the same as those of Steps S501 through S503 in FIG. 14. Thus, the processes performed in Step S604 through S610 are described and further explanation of the processes performed in Step S601 through S603 in FIG. 17 is omitted.

After the fabrication of the physical document data P, the physical document fabricating part 25 transmits the image data 61 of the physical document data P together with the physical document data P to the image converting part 27 (Step S604). Then, the document output controlling part 22 requests the image converting part 27 to perform image conversion (image converting process) (Step S605).

Then, the document output controlling part 22 requests the document outputting part 26 to perform document output (document outputting process) (Step S606).

Then, the document outputting part 26 receiving the document output request transmits image data 61 defined with an image converting condition(s) corresponding to the output method of the document to the image converting part 27 and requests the image converting part 27 to transfer image converted physical document data P (Step S607).

Accordingly, the image converting part 27 performs image conversion (e.g., conversion of color space and/or conversion of data format) based on the image data 61 of the fabricated physical document data P and the image data 61 defined with an image converting condition(s) corresponding to the output method of the document (Step S608). Then, the image converted physical document data (image data) P and the image data 61 of the image converted physical document data P are transferred to the document outputting part 26 (Step S609).

Accordingly, the document outputting part 26 outputs a document based on the image converted physical document data P according to operating condition settings (output conditions 41) corresponding to the designated output method (Step S610). In this step, the document outputting part 26 outputs the document using one of the printing part 26a, the mail transmitting part 26b, and the storing part 26c according to the designated output method.

Thus, with the image processing apparatus 100 according to the second embodiment, a document is output by fabricating physical document data P (image data) based on logical document data D (vector data) independent from the output method and output conditions of the document, performing image conversion on the physical document data P based on predetermined image conversion condition(s), and outputting the document based on the image converted physical document data P.

In a case of outputting a document with the image processing apparatus 100 according to the second embodiment, logical document data D are fabricated by a corresponding logical document fabricating module 32 based on the designated kind of document, and physical document data P are fabricated based on the logical document data D. Then, an image converting process is performed on fabricated physical document data D based on image conversion conditions corresponding to the output method of the document defined in the document definition data 31 designated by the user. Then, the document is output based on the image converted physical document data P according to the output conditions defined in the document definition data 31.

With the image processing apparatus 100 according to the second embodiment, an output pattern can easily be designated by simply selecting pre-registered document definition data 31. Further, by fabricating generalized (general purpose) format such as the logical document data D, a document corresponding to the output method and the output condition 41 can be output. Further, by providing an image converting function corresponding to the output method of the document, the document can be adaptively output according to various formats. Thus, the outputting methods of the document can be easily expanded.

Hence, with the above-described embodiment of the image processing apparatus 100, satisfactory operability can also be attained when outputting a document, and a document can be adaptively output according to the output method and the output condition 41. Further, the outputting methods of the document can be easily expanded.

[Third Embodiment]

In the image processing apparatus 100 according to the first and second embodiments, outputting of a document is performed in a case of receiving an output instruction via the UI part.

The image processing apparatus 100 according to the third embodiment may not only receive an output instruction from the user via the UI part but also from other function parts (applications) of the image processing apparatus 100 and automatically output a document (automatic document outputting function). This automatic document outputting function can be used in situations such as periodically outputting a document to the administrator indicating the status of the components of the image processing apparatus 100 according to a managing function of the image processing apparatus 100.

Since the configuration of the image processing apparatus 100 of the third embodiment is substantially the same as that of the first and second embodiments except for automatic document outputting function (including the below-described event controlling process, setting process, output result notifying process), like components are denoted by like reference numerals as of the first and second embodiments are not further described.

<Image Processing Function>

Next, an image processing function of the image processing apparatus 100 according to the third embodiment of the present invention is described.

<<Configuration of Each Component for Achieving Image Processing Function>>

Figure 18:
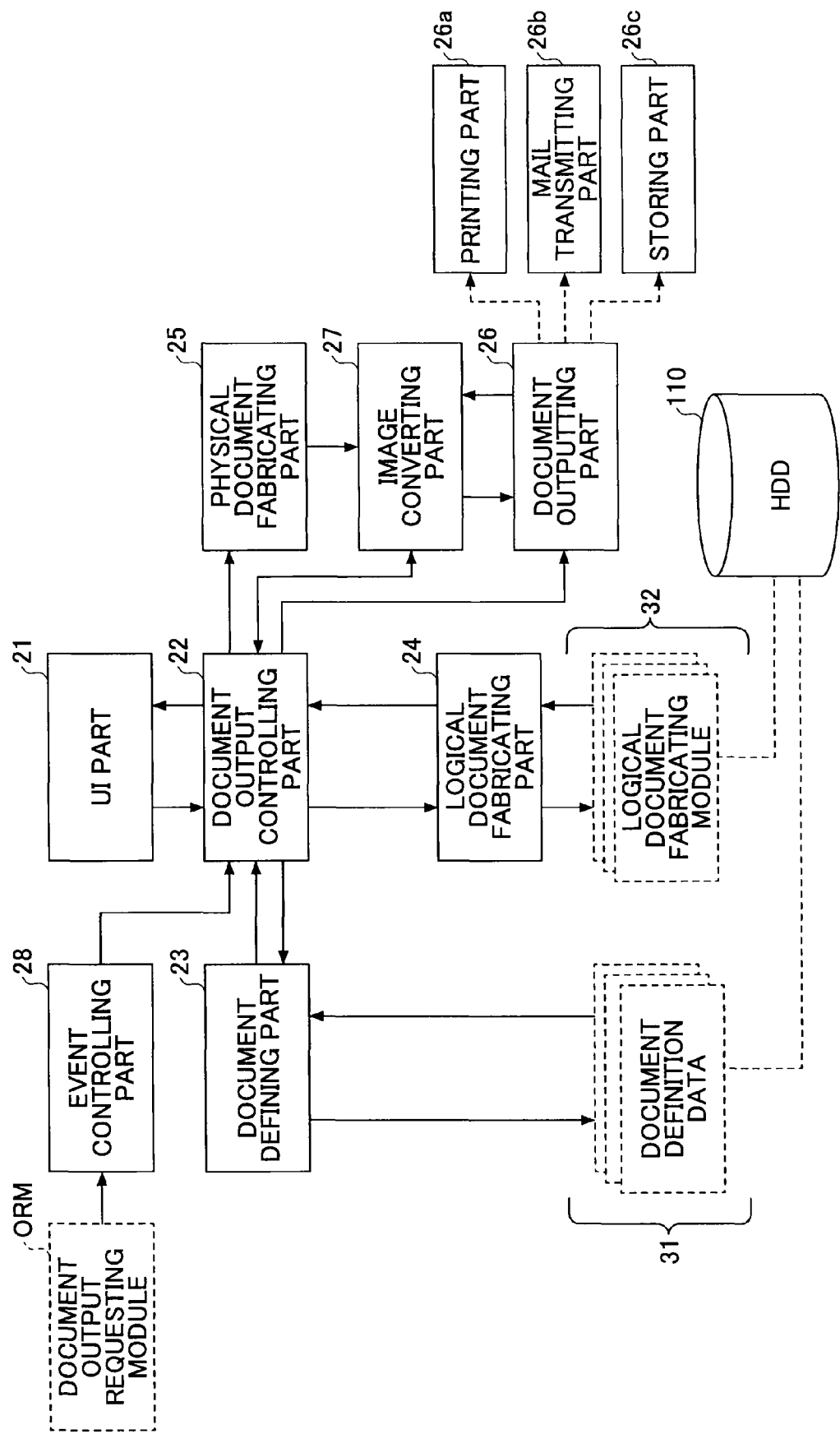
FIG. 18 is a schematic diagram illustrating a configuration of image processing function parts according to an embodiment of the present invention.

FIG. 18 is a schematic diagram illustrating a configuration of the image processing function parts according to the third embodiment of the present invention. In addition to function parts such as the UI part 21, the document outputting part 22, the document defining part 23, the logical document fabricating part 24, the physical document fabricating part 25, the document outputting part 26, and the image converting part 27, the image processing apparatus 100 of the third embodiment includes an event controlling part 28. Thus, the image processing apparatus 100 of the third embodiment can provide the automatic document outputting function in various output patterns for the function parts of the image processing apparatus 100.

The functions of the above-described function parts are achieved by reading an image processing program (software component) from the ROM 105 to the RAM 106 and executing the program with the CPU 108.

The event controlling part 28 is for instructing other function parts to output a document based on a data output request from other function parts of the image processing apparatus 100.

The function part requesting data output includes a document output requesting module ORM (Output Requesting Module) for requesting data (document) to be output. The module ORM issues (distributes) a document output event containing document ID (data for identifying the kind of document).

The event controlling part 28 receives an output request by receiving a document output event issued by the document output requesting module ORM. Accordingly, the event controlling part 28 transmits the document output event including event related data (data indicating the event requested for automatic document output) to the document output controlling part 22 and instructs outputting of the document.

The event controlling part 28 performs the below-described event controlling process based on event related data.

EVENT RELATED DATA EXAMPLE 1

Figure 19:
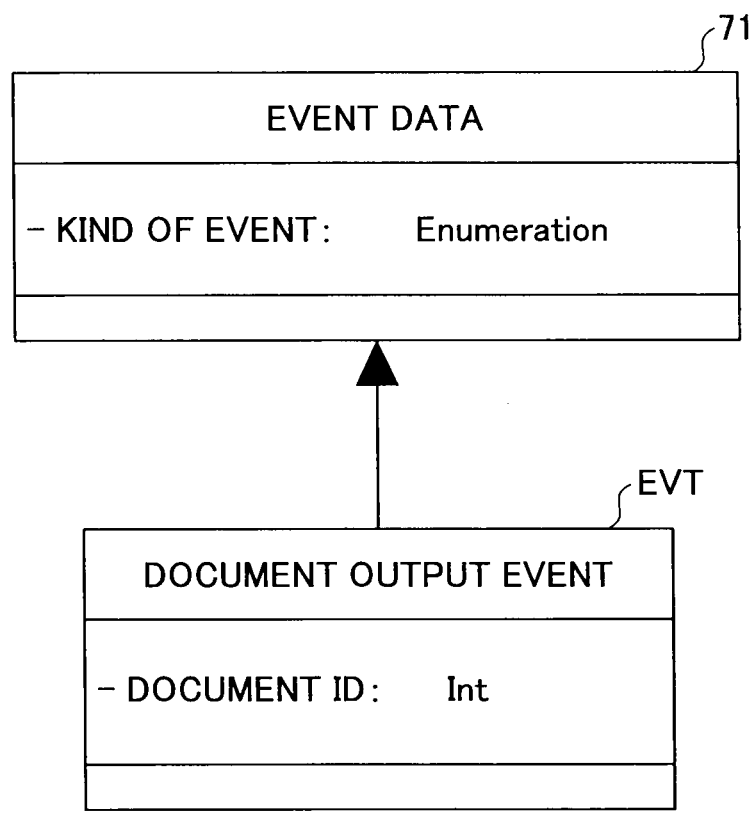
FIG. 19 is a schematic diagram illustrating a data configuration of event related data (example 1) according to an embodiment of the present invention.

Next, event related data according to the third embodiment is described. FIG. 19 is a schematic diagram illustrating a data configuration of event related data (example 1) according to an embodiment of the present invention.

FIG. 19 illustrates event related data having a configuration that can be defined as event data 71. The event data 71 include data related to performing event control in which a document output event EVT is defined as an event for automatically outputting a document. For example, "kind of event" (data indicating the kind of document output event EVT) can be defined in the event data 71. The event data 71 is associated to the document output event EVT received from a function part of the image processing apparatus 100.

The same as the document definition data 31, the event data 71 has a generalized configuration as illustrated in FIG. 5.

Accordingly, changes of the document output event EVT (e.g., addition/deletion of function parts requesting document (data) output) can be adaptively modified (absorbed) by the data configuration of the event data 71. Further, by uniformly managing the event data 71 with the event controlling part 28, the changes of the document output event EVT can be prevented from affecting the software I/F of the document output controlling part 22. Thus, maintenance of the image processing functions of the image processing apparatus 100 can be improved.

<<Automatic Document Outputting Function>>

Next, an event controlling process performed in the automatic document outputting operation is described.
(Receiving Issued Document Output Event and Obtaining Document Definition Data)

The event controlling part 28 receives an issued document output event EVT (including document ID), associates the document output event EVT with event data 71, and transmits the document output event EVT together with the event data 71 as a target document output event to the document output controlling part 22, to thereby request output of a document. Accordingly, the document output controlling part 22 obtains document definition data 31 corresponding to the document ID of the document designated to be output.

Figure 20:
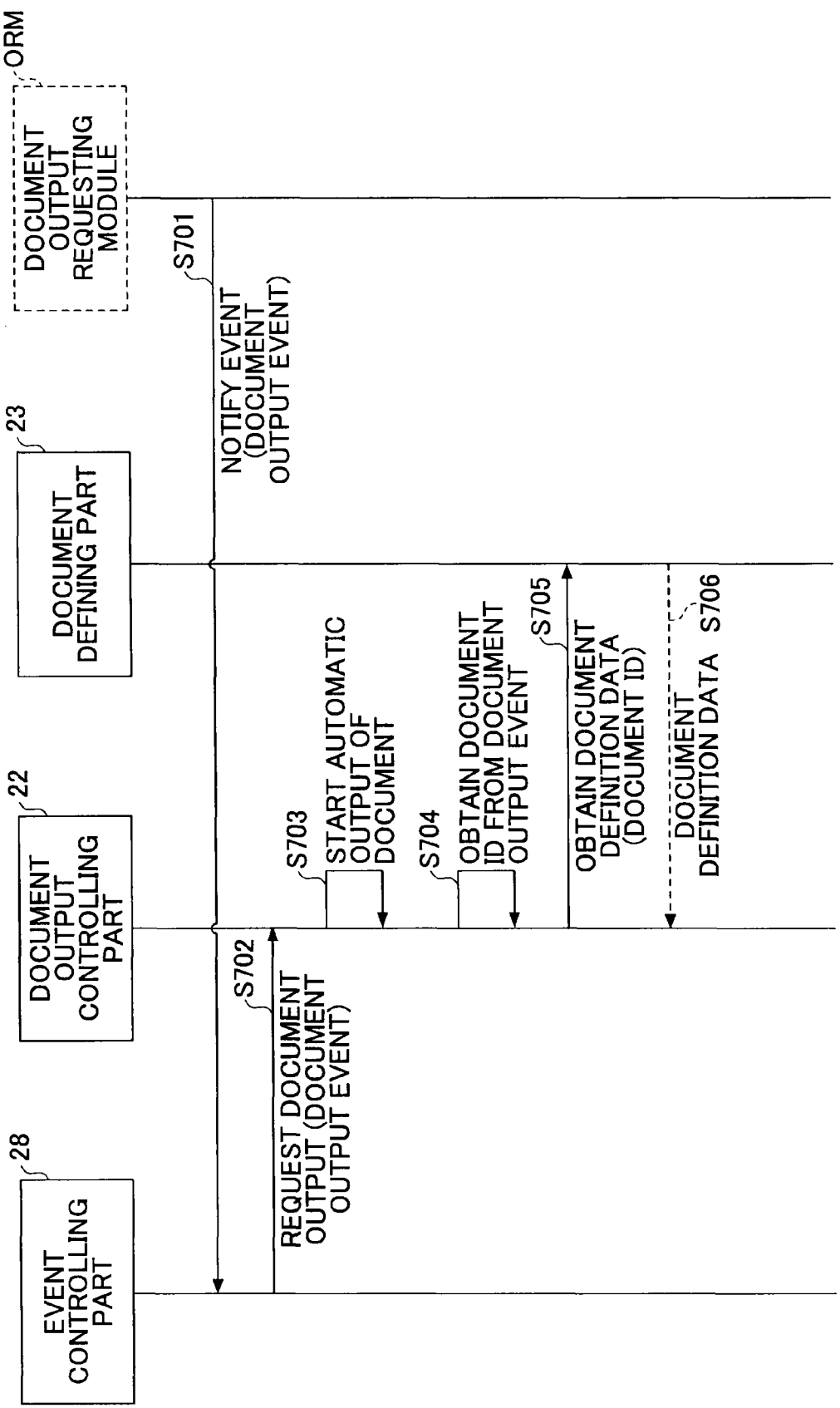
FIG. 20 is a schematic diagram for describing the processes of receiving a document output event EVT and obtaining corresponding document definition data according to an embodiment of the present invention.

Next, the processes of receiving a document output event EVT and obtaining corresponding document definition data 31 according to an embodiment of the present invention are described with reference to FIG. 20. FIG. 20 is a schematic diagram for describing the processes of receiving a document output event EVT and obtaining corresponding document definition data 31 according to an embodiment of the present invention.

The event controlling part 28 receives a document output event EVT issued by a document output requesting module ORM (Step S701).

Then, the event controlling part 28 associates the document output event EVT with the event data (data defining the kinds of events) as an event for automatic event output and transmits the document output event to the document output controlling part 22 for instructing a document to be output (Step S702).

The document output controlling part 22 starts automatic document output in correspondence with the request from the event controlling part 28 (Step S703).

The document output controlling part 22 obtains the document ID from the document output event EVT associated to the event data 71 (Step S704). Then, the document output controlling part 22 requests to obtain corresponding document definition data 31 to the document defining part 23 by transmitting the obtained document ID to the document defining part 23 (Step S705). Then, the document defining part 23, in accordance with the request, searches through all of the registered document definition data 31 (document definition data 31 stored in the HDD 110) by referring to the obtained document ID and transmits the document definition data 31 defining the document ID to the document output controlling part 22 (Step S706).

Accordingly, the image processing apparatus 100 according to the third embodiment starts automatic output of a kind of document designated to be output based on the document output event EVT and identifies the document definition data 31 corresponding to the kind of document from the document definition data 31 stored in the HDD 110. Then, the image processing apparatus 100 uses the document outputting part 26 to output a document corresponding to the document type based on the output method and the output condition of the document.

EVENT RELATED DATA EXAMPLE 2

In the above-described case of performing automatic document output based on the event data (as described with FIG. 19), a document is output based on the output method and the output condition of the document defined in the document definition data 31 corresponding to the document ID. That is, although a document is automatically output, the function part issuing the event is unable to designate the output condition in performing the document output. Therefore, in the following embodiment of the present invention, event control process is performed by issuing a document output event EVT having a configuration illustrated in FIG. 21 with the document output requesting module ORM and associating the document output event EVT and the event data 71.

Figure 21:
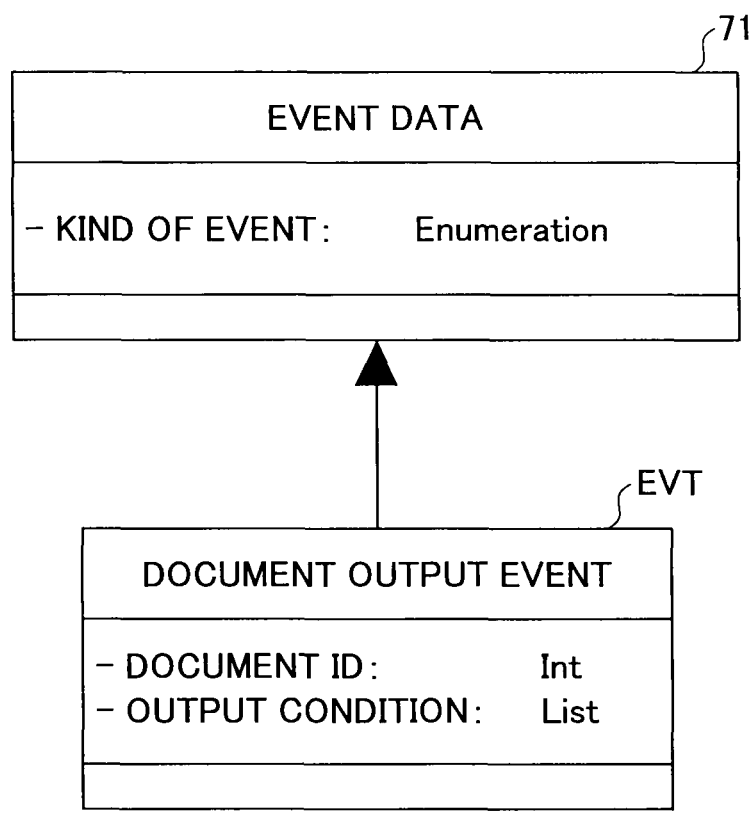
FIG. 21 is a schematic diagram illustrating a data configuration of data related to document output event (event related data (example 2)) according to an embodiment of the present invention.

FIG. 21 is a schematic diagram illustrating a data configuration of data related to document output event EVT (event related data (example 2)). The event controlling part 28, in addition to associating document ID, associates document output event EVT containing output conditions 41 (data indicating output conditions when performing automatic document output) with the event data 71, to thereby perform an event controlling process. In this case, the event controlling process by the event controlling part 28 is executed with the processes described in Step S701 through S706 (see FIG. 20).

Next, the processes for setting output conditions 41 after performing the event controlling process are described.
(Condition Setting in Automatic Document Output)

Figure 22:
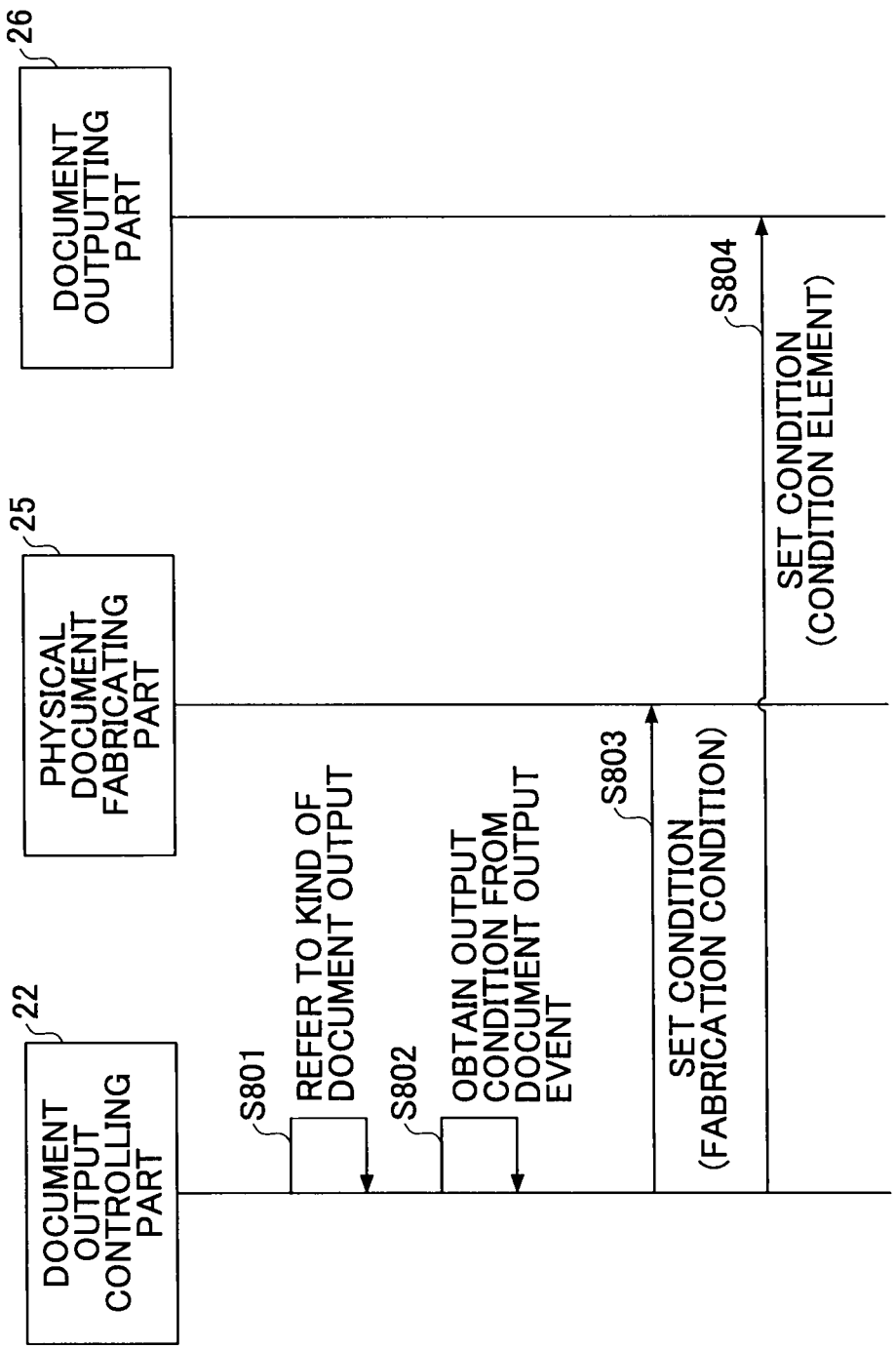
FIG. 22 is a schematic diagram for describing processes for setting output conditions in correspondence with an issued document output according to an embodiment of the present invention.

FIG. 22 is a schematic diagram for describing processes for setting output conditions 41 in correspondence with an issued document output EVT according to the third embodiment of the present invention.

The document output controlling part 22 refers to the kind of document output defined in the document definition data 31 obtained in Step S706 (Step S801). Thereby, the image processing apparatus 100 can know the designated output method.

Then, the document output controlling part 22 obtains output conditions 41 from the document output event EVT associated to the event data 71 (Step S802).

Then, the document output controlling part 22 transmits a control value of each condition element 51 of the obtained output conditions to the physical document fabricating part 25 and sets operating conditions. Further, in a case where the output method is "printing", the document output controlling part 22 transmits control values of the operation controlling method of the physical document fabricating part 25 to the physical document fabricating part 25 and sets the conditions for fabricating the physical document data P (Step S803).

Further, the document output controlling part 22 transmits output elements 51 of the output conditions 41 together with data indicating designation of the output method to the document outputting part 26, to thereby set the output conditions 41 (Step S804).

Accordingly, the image processing apparatus 100 according to this embodiment can set document output related conditions based on the output conditions 41 contained in the documents output event EVT and output a document according to the output conditions.

EVENT RELATED DATA EXAMPLE 3

Further, the image processing apparatus 100 according to this embodiment may also notify output results indicating whether a document is output in response to a document output request by a function part of the image processing apparatus 100. Therefore, in the following embodiment of the present invention, event control process is performed by issuing a document output event EVT having a configuration illustrated in FIG. 23 with the document output requesting module ORM and associating the document output event EVT and the event data 71.

Figure 23:
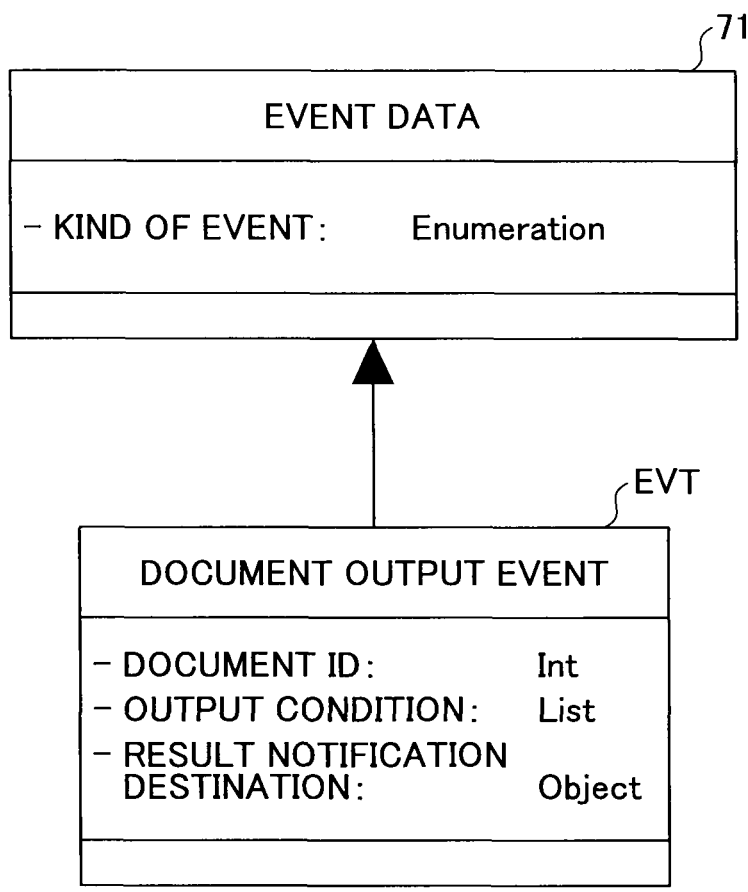
FIG. 23 is a schematic diagram illustrating a data configuration of data related to document output event (event related data (example 3)) according to an embodiment of the present invention.

FIG. 23 is a schematic diagram illustrating a data configuration of data related to document output event EVT (event related data (example 3)). The event controlling part 28, in addition to associating document ID and output conditions 41, associates document output event EVT containing data indicating the destination for notifying the result of the document output (also referred to as "result notification destination" such as a function pointer of the document output requesting module ORM) with the event data 71, to thereby perform an event controlling process. In this case, the event controlling process by the event controlling part 28 is executed with the processes described in Step S701 through S706 (see FIG. 20). Further, the condition setting process is executed with the processes described in Step S801 through S804 (see FIG. 22).

Next, the processes for notifying the output result after the document output process according to an embodiment of the present invention are described.

(Outputting a Document and Notifying the Output Result)

FIG. 24 is a schematic diagram for describing the processes for notifying the output result after the document output process according to an embodiment of the present invention. In FIG. 24, the processes in Steps S901 through S910 are substantially the same as those of Steps S601 through S610 of FIG. 17 and are not further explained.

The document outputting part 26, in accordance with a designated output method, outputs a document based on the physical document data P according to the operating condition settings (output conditions 41). Accordingly, the output result is transmitted from the document output part 26 to the image converting part 27 (Step S911) and further transmitted from the image converting part 27 to the document output controlling part 22 (Step S912).

The document output controlling part 22, upon receiving the output result, obtains the data indicating the result notification destination from the document output event EVT associated to the event data 71 (Step S913) and transmits the output result to the result notification destination (document output requesting module ORM) indicated in the result notification destination (Step S914).

Accordingly, with the above-described embodiment of the image processing apparatus 100, after a document is output, the result of the output can be transmitted to the document output requesting module ORM corresponding to the result notification destination of the document output event EVT associated to the event data 71, so that the function part requesting the output can be informed of the output result.

With the image processing apparatus 100 according to the third embodiment, a document output request from a function part (application) can be received as a document output event and associated with event data 71. Then, the image processing apparatus 100 fabricates logical data D (vector data) with a corresponding logical document fabricating module 32 based on the kind of document included in the document output event EVT associated to the event data 71 and fabricates physical document data P (image data) based on the logical document data D. Then, the image processing apparatus 100 outputs a document based on the physical document data P according to the output method and output condition defined in the document definition data 71 uniquely corresponding to the document ID or according to the output conditions included in the document output event EVT associated to the event data 71.

Thus, the image processing apparatus 100 of the third embodiment, in accordance to a document output request from a function part (application) of the image processing apparatus 100, can easily designate an output pattern by simply selecting pre-registered document definition data 31. Further, by fabricating generalized (general purpose) format such as the logical document data D, a document corresponding to the output method and the output condition 41 can be output.

Hence, with the above-described embodiment of the image processing apparatus 100, satisfactory operability can also be attained when outputting a document, and a document can be adaptively output according to the output method and the output condition 41. Further, not only can a document be output in response to a request from the user but a document can also be automatically output in response to a request from a function part (application) of the image processing apparatus 100. Further, output conditions 41 can be designated when automatically outputting the document, so that a document can be adaptively output according to various output patterns in the same manner as outputting a document in response to a request from the user. Further, since an output result can be transmitted to the function part (application) having requested output of a document, the function part can be informed whether the document has been appropriately output.

The image processing function of the above-described embodiments of the image processing apparatus 100 can be achieved by causing a computer to execute a program written in a programming language suited for the operation environment (platform) of the controller 13. Accordingly, the image processing program of the above-described embodiments of the present invention may be recorded in a computer-readable recording medium 104.

Accordingly, the image processing program of the above-described embodiments of the present invention may be recording in the recording medium 104 such as a floppy disk (registered trademark), a CD (Compact Disc), or a DVD (Digital Versatile Disk). The image processing program of the above-described embodiments of the present invention may be installed in the image processing apparatus 100 from the recording medium 104 to the drive device 103 capable of reading out data from the recording medium 104. Since the image processing apparatus 100 includes a data communications I/F 14, the image processing program of the above-described embodiments of the present invention may be downloaded from a network (e.g., the Internet) via a telecommunication line and installed into the image processing apparatus 100.

The data processed by the image processing apparatus 100 are not be limited to data items such as the document definition data 31, the image data 61, and the event data 71. The data processed by the image processing apparatus 100 have a generalized data configuration. The data items included in the data can be changed in correspondence with the output method and the output conditions supported by the image processing apparatus 100, image conversion, or other events by the image processing apparatus 100.

The outputting parts of the document outputting part 26 are not limited to the printing part 26a, the mail transmitting part 26b, and the storing part 26c. The outputting parts of the outputting part 26 may be other outputting parts supporting by the image processing apparatus 100.

The data that are output as a document are not limited to data managed by the image processing apparatus 100. For example, in a case where the image processing apparatus 100 is connected to another apparatus via a telecommunication line and capable of bi-directional communication, the data managed by the other apparatus may be output as a document.

The present invention is not limited to the specifically disclosed embodiments, and variations and modifications may be made without departing from the scope of the present invention.

The present application is based on Japanese Priority Application No. 2008-054819 filed on Mar. 5, 2008, with the Japanese Patent Office, the entire contents of which are hereby incorporated herein by reference.

What is claimed is:

1. An image processing apparatus for outputting a document including a data group containing a plurality of data items, comprising:
    a storing part configured to store document definition data in which a plurality of document kind data indicating contents of output documents are defined in correspondence with output pattern data, the output pattern data including output method data and output condition data;
    a structured data fabricating part configured to fabricate structured data including the data group according to the document kind data, the structured data being independent from an output method and an output condition of the document, the structured data fabricating part including a plurality of logical document fabricating modules corresponding to the plurality of document kind data;
    an image data fabricating part configured to fabricate image data of the document according to the structured data;
    an identifying part configured to identify target document definition data among the document definition data that correspond to designated document kind data;
    an outputting part configured to output the image data according to the output pattern data corresponding to the document kind data defined in the target document definition data; and
    a document function providing module configured to be installed in and uninstalled from the image processing apparatus, the document function providing module configured to register additional document definition data, in which additional document kind data are defined, and an additional logical document fabricating module that corresponds to the additional document kind data.

2. The image processing apparatus as claimed in claim 1, further comprising:
    a displaying part configured to extract the document definition data from the storing part and display the output pattern data defined in the extracted document definition data; and
    a receiving part configured to receive a selection of the displayed output pattern data made by a user;
    wherein the identifying part is configured to identify the target document definition data according to the selection received by the receiving part.

3. The image processing apparatus as claimed in claim 2, wherein the displaying part is configured to display recommended output pattern data among the displayed output pattern data.

4. The image processing apparatus as claimed in claim 1, wherein in a case where an image area of the image data is larger than an output area output by the outputting part, the image data fabricating part is configured to perform an image process so that the image area can be contained within the output area.

5. The image processing apparatus as claimed in claim 1, wherein in a case an image area of the image data is larger than an output area output by the outputting part, the image data fabricating part is configured to fabricate the image data based on the structured data having the number of the plural items in the data group reduced.

6. The image processing apparatus as claimed in claim 1, further comprising:
    a software component storing part configured to store a plurality of software components in correspondence with the document kind data;
    wherein the structured data fabricating part is configured to fabricate the structured data by identifying a target software component among the plural software components and operating on the target software component.

7. The image processing apparatus as claimed in claim 1, wherein the output condition data include one or more output conditions that correspond to the output method data, wherein the output conditions have a common data item.

8. The image processing apparatus as claimed in claim 1, further comprising:
    an image converting part configured to perform an image converting process on the image data fabricated by the image data fabricating part;
    wherein the image converting part converts the image data into a predetermined data format in correspondence with the output method data.

9. The image processing apparatus as claimed in claim 1, further comprising:
    an event data transmitting part configured to transmit event data including the document kind data corresponding to the document requested to be output from an application; and
    a controlling part configured to control the outputting of the document according to the event data transmitted from the event data transmitting part.

10. The image processing apparatus as claimed in claim 9, wherein the event data transmitting part is configured to transmit the event data further including at least one of the output condition data and a result notification data indicating a destination for transmitting a result of outputting the document.

11. An image processing method for an image processing apparatus for outputting a document including a data group containing a plurality of data items, comprising the steps of:
    storing document definition data in which a plurality of document kind data indicating contents of output documents are defined in correspondence with output pattern data, the output pattern data including output method data and output condition data;
    fabricating structured data including the data group according to the document kind data, the structured data being independent from an output method and an output condition of the document, the fabricating structured data step further including managing a plurality of logical document fabricating modules that correspond to the plurality of document kind data;

fabricating image data of the document according to the structured data;

identifying target document definition data among the document definition data that correspond to designated document kind data;

outputting the image data according to the output pattern data corresponding to the document kind data defined in the target document definition data; and registering, using a document function providing module, additional document definition data, in which additional document kind data are defined, and an additional logical document fabricating module that corresponds to the additional document kind data, the document function providing module configured to be installed in and uninstalled from the image processing apparatus.

12. The image processing method as claimed in claim 11, further comprising the steps of:

extracting the document definition data stored in the storing step;

displaying the output pattern data defined in the document definition data extracted in the extracting step; and receiving a selection of the displayed output pattern data made by a user;

wherein the target document definition data are identified according to the selection received in the receiving step.

13. The image processing method as claimed in claim 12, wherein the displaying step includes a step of displaying recommended output pattern data among the displayed output pattern data.

14. The image processing method as claimed in claim 11, wherein in a case where an image area of the image data is larger than an output area output in the outputting step, an image processing is performed in the image data fabricating step, so that the image area can be contained within the output area.

15. The image processing method as claimed in claim 11, wherein in a case an image area of the image data is larger than an output area output in the outputting step, the image data is fabricated based on the structured data having the number of the plural items in the data group reduced.

16. The image processing method as claimed in claim 11, further comprising the steps of:

storing a plurality of software components in correspondence with the document kind data;

wherein the structured data fabricating step includes a step of fabricating the structured data by identifying a target software component among the plural software components and operating on the target software component.

17. The image processing method as claimed in claim 11, further comprising a step of:

performing an image converting process on the image data fabricated in the image data fabricating step;

wherein the image data is converted into a predetermined data format in correspondence with the output method data.

18. The image processing method as claimed in claim 11, further comprising the steps of:

transmitting event data including the document kind data corresponding to the document requested to be output from an application; and controlling the outputting of the document according to the event data transmitted in the transmitting step.

19. The image processing method as claimed in claim 18, wherein the transmitting step includes a step of transmitting the event data further including at least one of the output condition data and a result notification data indicating a destination for transmitting a result of outputting the document.

20. The image processing method as claimed in claim 11, further comprising the step of:

identifying one of the plurality of logical document fabricating modules based on identification data of a corresponding document kind data.

* * * * *